(12) United States Patent
Dames

(10) Patent No.: US 7,095,915 B2
(45) Date of Patent: Aug. 22, 2006

(54) BEAM STEERING ARRANGEMENTS AND OPTICAL SWITCHES

(75) Inventor: Andrew Nicholas Dames, Cambridgeshire (GB)

(73) Assignee: Polatis Limited, (GB)

( * ) Notice: Subject to any disclaimer, the term of this patent is extended or adjusted under 35 U.S.C. 154(b) by 105 days.

(21) Appl. No.: 10/432,917

(22) PCT Filed: Dec. 4, 2001

(86) PCT No.: PCT/GB01/05361

§ 371 (c)(1), (2), (4) Date: Sep. 22, 2003

(87) PCT Pub. No.: WO02/46825

PCT Pub. Date: Jun. 13, 2002

(65) Prior Publication Data

US 2004/0042716 A1    Mar. 4, 2004

(30) Foreign Application Priority Data

| Dec. 4, 2000 | (GB) | 0029439.7 |
| Jan. 5, 2001 | (GB) | 0100062 |
| Jun. 20, 2001 | (GB) | 0115067.1 |
| Jun. 20, 2001 | (GB) | 0115068.9 |
| Jul. 5, 2001 | (GB) | 0116245.2 |

(51) Int. Cl.
G02B 6/26 (2006.01)

(52) U.S. Cl. .............. 385/16; 385/25; 385/33
(58) Field of Classification Search ........... 385/15–17, 385/25, 31, 33–35, 38, 39
See application file for complete search history.

(56) References Cited

U.S. PATENT DOCUMENTS

| 4,512,036 A | 4/1985 | Laor |
| 4,543,663 A | 9/1985 | Laor |
| 4,580,292 A | 4/1986 | Laor |
| 4,651,343 A | 3/1987 | Laor |
| 4,657,339 A | 4/1987 | Fick |
| 4,896,935 A | 1/1990 | Lee |
| 5,479,541 A | 12/1995 | Pan |
| 5,524,153 A | 6/1996 | Laor |
| 5,715,337 A | 2/1998 | Spitzer et al. |
| 5,727,098 A | 3/1998 | Jacobson |
| 6,005,998 A | 12/1999 | Lee |
| 6,738,539 B1 * | 5/2004 | Hagood et al. .............. 385/16 |
| 2002/0181844 A1 * | 12/2002 | Vaganov .................. 385/17 |

FOREIGN PATENT DOCUMENTS

| DE | 2016498 | 4/1970 |
| JP | 61185715 A * | 8/1986 |
| JP | 04237010 A * | 8/1992 |
| JP | 07272501 A * | 10/1995 |

OTHER PUBLICATIONS

WO 02/069532 A3—PCT/US01/42812, Oct. 25, 2001.

* cited by examiner

*Primary Examiner*—Sung Pak
(74) *Attorney, Agent, or Firm*—Galgano & Burke, LLP

(57) ABSTRACT

To steer a beam in an optical switch, a collimator joined to an optical fiber along a Z-axis is mounted in a gimbal for rocking movement about X and Y axes. A piezoelectric actuator extends along the Z-axis and is symmetric about the fiber. An angular position sensor on the collimator provides feedback for use in steering the beam.

11 Claims, 20 Drawing Sheets

BEAM STEERING ARRANGEMENTS AND OPTICAL SWITCHES

The present invention relates to beam steering arrangements and particularly to optical switches.

It is an aim in contemporary communication systems to convey communication traffic substantially as modulated optical radiation. Moreover, such communication systems are increasingly required to be agile, namely capable of reconfiguring themselves.

Thus, optical communication systems require optical switching assemblies which can route optical radiation between input and outputs in accordance with externally provided routing information.

Several different configurations for optical switching assemblies have been proposed including assemblies which form the input radiation into beams that are spatially directed to selected output ports. The need to provide ever increasing switch capability in the form of larger numbers of input and output ports has lead to increases in size, complexity and power consumption and cost of such assemblies.

It is an object of various aspects of the present invention to remove or ameliorate some or all of these difficulties, especially by providing an improved beam steering arrangement for use in such assemblies.

Various schemes have been proposed for directing a beam. Typical schemes include the scanning movement of an input optic fibre over an array of output fibres; the displacement of an optic fibre relatively to a collimating lens so as to vary the angle of the collimated beam and the use of micro-mirrors to reflect beams in selected angles.

The present inventors have recognised that a critical factor in determining whether a large number of ports can be accommodated within a given switch volume is the spatial dimension of the individual beam steering arrangements in the directions orthogonal to the beam direction. A convenient switch geometry has opposing two dimensional arrays of input and output ports separated in the Z direction by a beam deflection region. The density with which the ports can be packed together is then determined by the X and Y dimensions of the beam steering arrangement of each port. Unfortunately, it is a feature of many prior art constructions that an increase in the number of ports and thereby an increase in the range of required beam deflection, leads to a substantial increase in the X and Y distances required for the operation of each port.

In a number of telecommunications applications, there are fixed limits on the volume available for installation of switches. In other applications, the advantages of a compact design lie in economies of usage and manufacture.

In one of its aspects, the present invention seeks to overcome this problem with a fresh approach to beam steering.

Accordingly, the present invention consists in one aspect in a beam steering arrangement comprising a support structure; a collimator; an optical fibre joining the collimator along a Z-axis; the collimator being constrained relative to the support structure for rocking movement only about one or more axes orthogonal to the Z-axis; and an actuator for rocking the collimator so as to steer a beam.

Advantageously, the collimator is mounted on the support structure through a gimbal.

It will be understood that by rocking a gimbal-mounted collimator, large beam deflection angles can be achieved within an arrangement that is extremely compact in the X and Y dimensions.

A complication arising in larger switches is that some form of dynamic feed back is generally necessary to ensure that each beam is deflected with sufficient precision to arrive at the intended target port. In one common feed back technique, the modulated beam is itself sampled to check that it is travelling between the correct input and output ports. There is a risk in such arrangements of cross talk between the data and routing control signal flows and of increased transmission loss within the switch. In an attempt to overcome such problems, it has previously been proposed to position subsidiary beams alongside or around the data-modulated beam and to sense these subsidiary beams in detectors positioned alongside or around each output port to provide feed back on the position of the main beam. Since these subsidiary beams remain optical in nature, there remains some risk of cross talk or risk of transmission loss in filtering to provide frequency separation between main and subsidiary beams. It will also be recognised that the positioning of subsidiary beams alongside or around each main beam will considerably increase the X and Y dimensions of the switch (or considerably reduce the capacity of the switch that can be accommodated within any given volume).

It is an object of certain aspects of the present invention to overcome or reduce these difficulties.

Accordingly, in another aspect, the present invention consists in a beam steering arrangement comprising a support structure; a collimator; an optical fibre joining the collimator along a Z-axis; the collimator being mounted for movement relative to the support structure at least pivotally about an X axis orthogonal to the Z-axis; an actuator for moving the collimator so as to steer a beam; and an angular position sensor providing a signal indicative of the orientation of the collimator about the X-axis for use in feedback by the actuator in steering of the beam.

The direct sensing of the angular position of a collimator provides an ingenious solution to the problem of providing feedback on the position of the beam. There is no risk of optical cross-talk and sensing structures are possible which fit within a highly compact XY envelope The angular position sensor may having interacting parts fixed relatively to the collimator and to the support structure, respectively. Those parts of the position sensor may interact electrically and/or magnetically, with one of the interacting parts serving to generate an electrical or magnetic field which is sensed by the other of the interacting parts.

In a further aspect, the present invention consists in a beam steering arrangement comprising a support structure; a collimator; an optical fibre joining the collimator along a Z-axis; the collimator being mounted for movement relative to the support structure at least about an X axis orthogonal to the Z-axis; and an actuator for moving the collimator so as to steer a beam; wherein the actuator comprises an elongate transducer, such as a cylindrical body of piezoelectric material, disposed along said Z-axis.

Conveniently, the fibre extends through an axial bore in the transducer and the arrangement is generally symmetric about the fibre.

By extending the transducer along the Z direction, and disposing the arrangement symmetrically about the fibre, this aspect of the present invention goes further in reducing the XY dimensions and increasing the density with which beam steering arrangements can be packed to provide compact, high capacity switches.

In preferred forms of the present invention, the actuator comprises a solid state transducer, such as body of piezoelectric material. The transducer is preferably elongate and extends in the direction of the Z-axis, an end of the transducer remote from the collimator being secured in the support structure, an end of the transducer adjacent the collimator being movable in the directions of the X and Y-axes through application of an actuator drive signal to the transducer. The transducer may be hollow and coaxial with a central fibre.

Advantageously, the transducer acts between the support structure and the optical fibre, the action of the optical fibre upon the collimator serving to move the collimator. The transducer may act through a lever, preferably in the form of a hollow cylinder coaxial with the optical fibre, which extends along the Z-axis and provides a mechanical advantage of at least 2:1 and preferably at least 5:1. This actuating lever may be pivotally mounted in the support structure, for example, through a gimbal. In one form of this invention, the actuator operates upon the optical fibre and the action of the optical fibre upon the collimator serves to move the collimator.

In still a further aspect, the present invention consists in an optical switch component comprising a plurality of beam steering arrangements, each in accordance with any one of the preceding claims, the beam steering arrangements having a common support structure and preferably being generally in the form of a plate extending in a plane containing the Z-axis and having a pair of flat, parallel stacking surfaces, relatively closely spaced along a stacking axis orthogonal to the Z-axis. These plate-like components may then be stacked to form an optical switch assembly. The construction of a switch from a number of similar sub-assemblies, each of which can be tested before final assembly, simplifies the manufacturing process and enables prompt and straightforward repair of units becoming defective after use One form of the invention consists in an P by Q optical switch, comprising P optical input ports; P like input beam steering arrangements in any of the forms above defined and each having its optical fibre associated with a respective one of the input ports; Q optical output ports; Q like output beam steering arrangements again in any of the forms above defined and each having its optical fibre associated with a respective one of the output ports; an optical pathway conveying beams between any one of the collimators of the input beam steering arrangements and any one of the collimators of the output beam steering arrangements; a routing input terminal and a routing controller adapted in response to routing information signals received at the routing input terminal to supply actuation signals to the actuators of selected beam steering arrangements so to steer the respective beams as to optically interconnect any selected input port with any selected output port.

Preferably, the beam steering arrangements are disposed in a radial formation, such that at least some of the respective beams meet at a central point in the rest condition.

The invention will now be described, by way of example only, with reference to the accompanying figures, in which.

Figure 1:
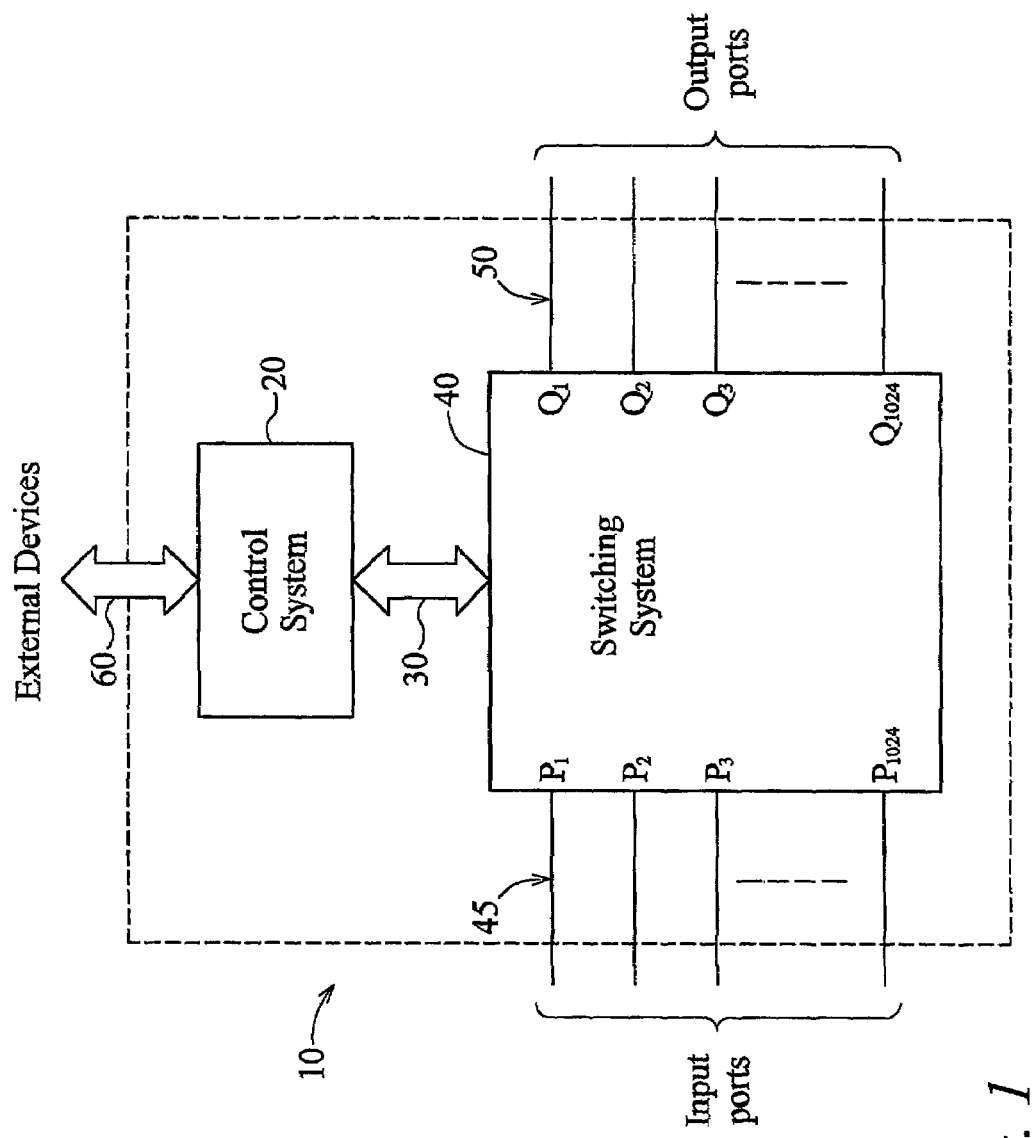
FIG. 1 is a schematic diagram of principal sections of an optical switching assembly according to the invention.

Referring initially to FIG. 1, there is shown a schematic diagram of principal sections of an optical switching assembly indicated generally by 10. The assembly 10 comprises a control system 20 connected via an internal interface 30 to a switching system 40. The switching system 40 includes 1024 optical input ports P1 to P1024 indicated by 45, and 1024 optical output ports Q1 to Q1024 indicated by 50. The control system 20 is also connected via an external interface 60 to external devices, for example management devices of a telecommunications system incorporating the assembly 10.

The input and output ports P, Q are designed to receive monomode optical fibres from external devices (not shown).

Figure 2:
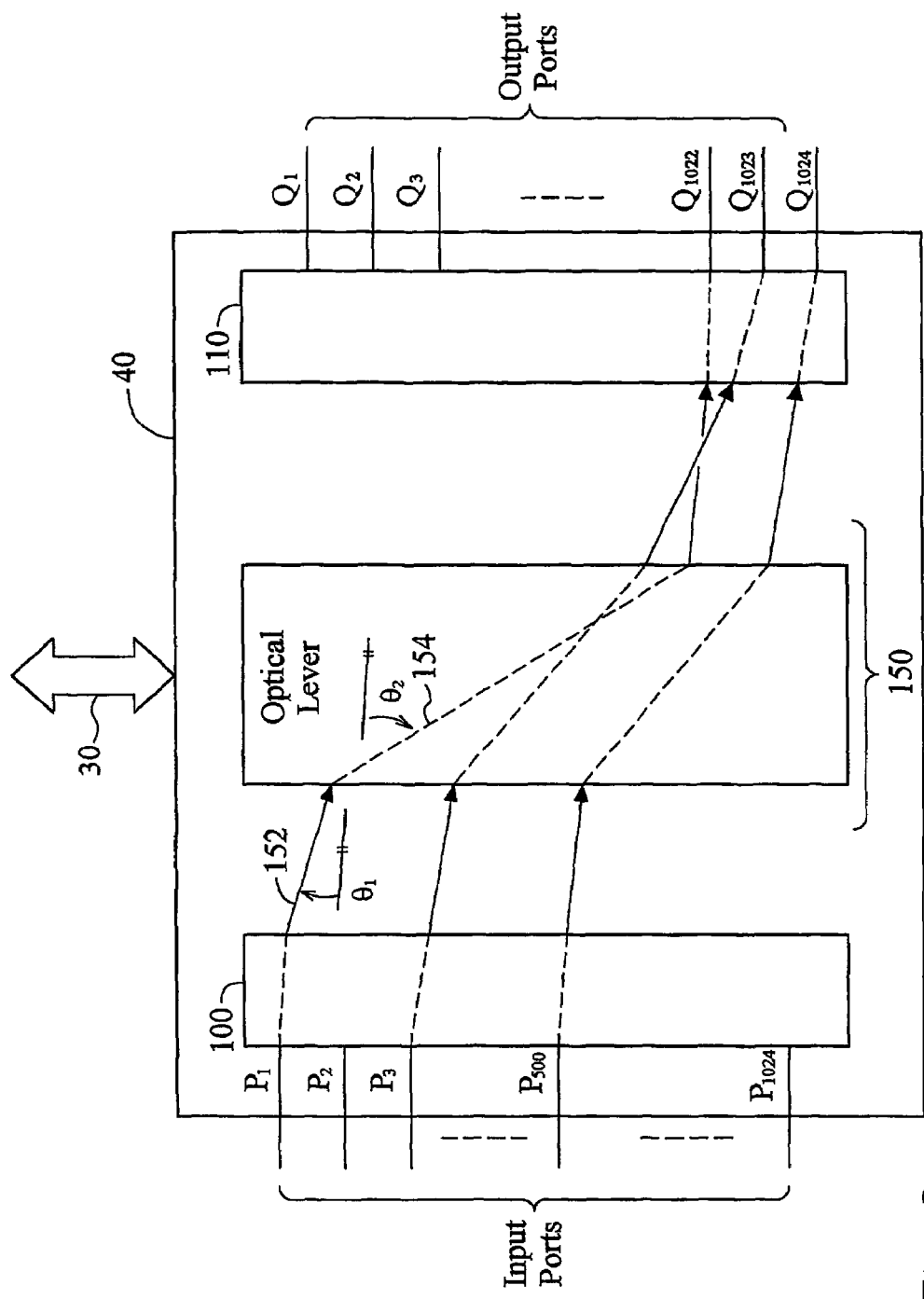
FIG. 2 is a schematic diagram of an optical switching unit included within the assembly in FIG. 1.

Construction of the switching system 40 will now be described in further detail with reference to FIG. 2.

The switching system 40 comprises an input array 100 optically connected to the input ports P1 to P1024, and an output array 110 optically connected to the output ports Q1 to Q1024. The input and output arrays 100, 110 are mounted within the switching system 40 and are spatially separated by a deflection region 120. The arrays 100, 110 are rigidly held within a housing which maintains them in precise and stable mutual alignment. Monomode optical fibres are connected from the input ports P1 to P1024 to corresponding inputs of the input array 100. Likewise, monomode optical fibres are connected from the output ports Q1 to Q1024 of corresponding outputs of the output array 110.

In operation, optical radiation input at the input ports P is conveyed along their associated optical fibres to corresponding input beam steering arrangements (not shown in FIG. 2) in the input array. Collimated beams are steered by these beam steering arrangements into the deflection region 120. For example, the system 40 is shown configured to receive optical radiation at the input ports P1, P2, P3 and P1024 and convey the radiation to the input array 100, from which corresponding collimated radiation beams 130, 135, 140 and 145 are respectively output. The beams 130, 135, 140 and 145 propagate through the deflection region 120 to be received at output beam steering arrangements (not shown in FIG. 2) of the output array 110. Radiation received at these output beam steering arrangements is directed to corresponding output ports Q1 to Q1024. For example, the beams 130, 135, 140 and 145 are received at actuators of the output array 110 associated with the output ports Q1, Q1024, Q4 and Q50 respectively. Thus, the switching system 40 in FIG. 2 has been configured by the control system 20 to establish optical connections from the input ports P1, P2, P3, P1024 to the output ports Q1024, Q4, Q1, Q50 respectively.

By altering steering directions of the aforesaid input and output actuators, other optical pathways through the switching system 40 can be established. It will be appreciated that steering directions of the actuators of the input and output arrays 100, 110 can be altered under control of the control system 20 in response to instruction received at the control system 20 from the external devices.

In the switching system 40, the input and output arrays 100, 110 are spaced in the order of 140 to 180 mm apart. Collimated beams of radiation propagating from the input array to the output array, or vice versa if the system 40 is operated in reverse, through the deflection region 120 are in the order of 400 to 800 µm in diameter. It will be appreciated from FIG. 2 that optical radiation routing within the switching system 40 can be bi-directional and that the terms "input array" and "output array" in the foregoing are used for clarity only in describing hardware.

In establishing optical routing within the switching system 40, it is of course vital that beams propagating within the deflection region 120 are directed accurately towards receiving apertures of the output array 110. As a consequence of the control system 20 not directly sampling the radiation beams propagating in the deflection region 120, the assembly 10 effectively relies on stably maintaining its calibration to provide reliable optical pathways.

Optical systems can be incorporated into the region 120 for additional direction of the steered beams as they traverse the deflection region 120. In FIG. 2, for example, a radiation beam 152 is shown emerging from the beam steering arrangement associated with input port P1 at an angle $\theta_1$ and propagating to an optical lever 150 serving to form a deflected beam 154 subtending an angle $\theta_2$, the angle $\theta_2$ being greater than the angle $\theta_1$ by a ratio corresponding to the optical levering factor of the lever 150. In FIG. 2, the beam 154 is illustrated as being directed towards an actuator associated with the output port Q1022.

Figure 3:
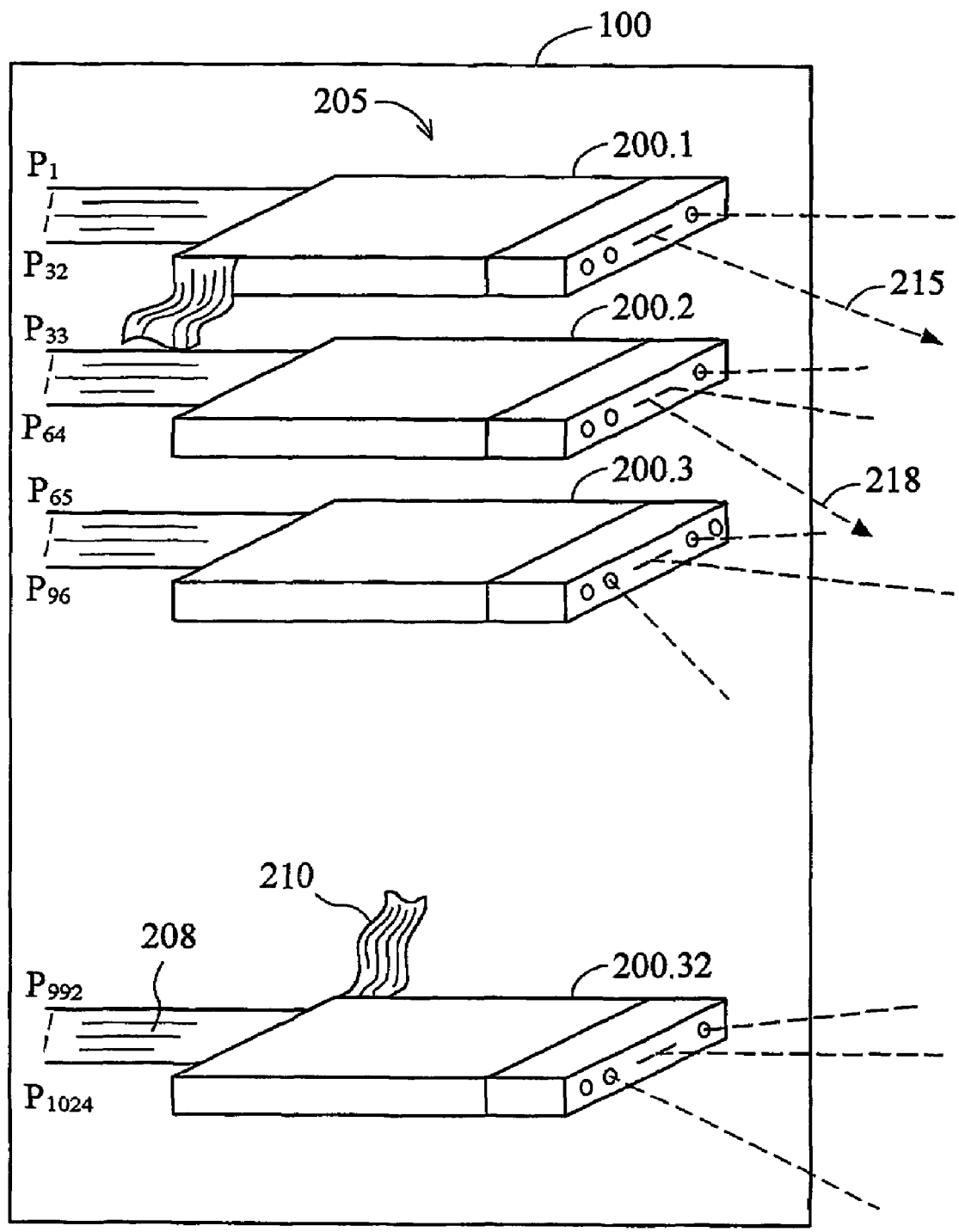
FIG. 3 is an illustration of construction of an input array of the switching unit in FIGS. 2 and 3 using a stack of similar actuator slices.

Incorporation of the lever 150 is of advantage in that actuators associated with the input array 100 need—for a particular physical geometry—deflect radiation beams over a smaller range of angles in order to be able to direct radiation to any selected output port Q. Thus, it is a requirement of the assembly 10 that it should be capable of steering radiation beams therein to a very high degree of accuracy in the order of 0.010° over a deflection range in the order of +/−5°, this representing 0.05 dB excess loss per axis Construction of the input array 100 will now be described with reference to FIG. 3. It will be appreciated that the output array 110 is constructed in a substantially similar manner to the input array 100.

The array 1100 comprises thirty-two optical switch components 200.1 to 200.32, each component comprising thirty-two like beam steering arrangements in a common support structure. These components 200 take the form of generally flat "slices" with flat, parallel staking surfaces. In the input array 100, the thirty-two slices 200 are stacked in the form of a 2-dimensional (2-D) array as indicated by 205.

Constructing the input array 100, and likewise the output array 110, in the form of a stack of slices is of advantage in that each of the slices can be constructed and tested individually before being assembled together. Moreover, in the event of one of the slices failing, the stack 205 can be dismantled and one or more faulty slices replaced, quickly and simply.

Each slice 200 is preferably designed so that it is connected to its respective input ports P by way of a ribbon of thirty-two optical fibres, for example a ribbon 208. Each ribbon 208 preferably is connected to its associated slice 200 at a rear end thereof. Likewise, each slice 200 preferably has its associated electrical connections conveyed along an associated electrical ribbon cable 210. The ribbon cables are preferable connected to the slices 200 in directions substantially orthogonal to that of the ribbons of optical fibre to assist with stacking the slices 200. Preferably, the electrical ribbon cables are arranged to connect on alternating sides to assist stacking the slices 200.

In operation, the slices 200 receive optical radiation from their respective input ports P and radiate the radiation in the form of steered collimated beams, for example collimated radiation beams 215, 218.

It will be appreciated from the foregoing that the slices 200 are substantially similar, not only in the input array 100 but also in the output array 110. This enables economies to be made in manufacture and in servicing.

Before describing in detail the structure and functioning of each slice 200 and the beam steering arrangements which it contains, it may be helpful to discuss in more general terms a key feature of this embodiment. This will be done with reference to FIG. 4.

A fibre optic 38 is shown bonded to a collimator 40. The collimator 40 may take a wide variety of forms and may be bonded to the fibre in many different ways, all apparent to the skilled man. Indeed, optic fibres with integral collimators are available commercially. The collimator may be formed by shaping the end of the fibre itself into a lens.

A very important advantage of integral fibre and collimator combinations is much reduced optical losses as compared with separate fibre and collimator arrangements and particular those arrangements which rely for beam steering on relative displacement of the fibre and collimator.

Figure 4:
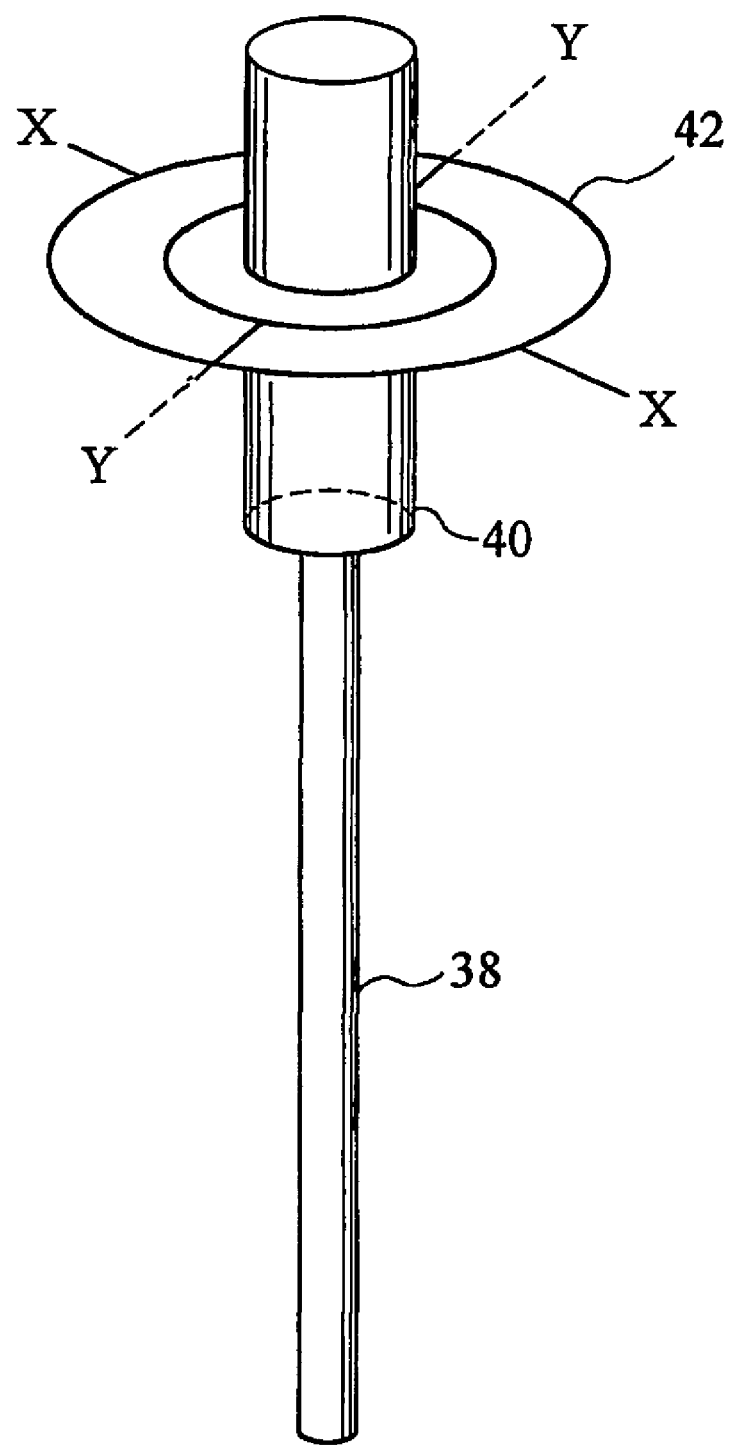
FIG. 4 is an illustration of a gimbal mounting for a collimator.

The key feature shown in FIG. 4 is the mounting of the collimator 40 in a gimbal 42. This gimbal mounting (represented diagrammatically in the figure) permits rocking movement of the collimator about X and Y axes which are orthogonal to the Z axis, being the beam-forming axis of the collimator. Translational movement of the collimator is effectively constrained.

Figure 5:
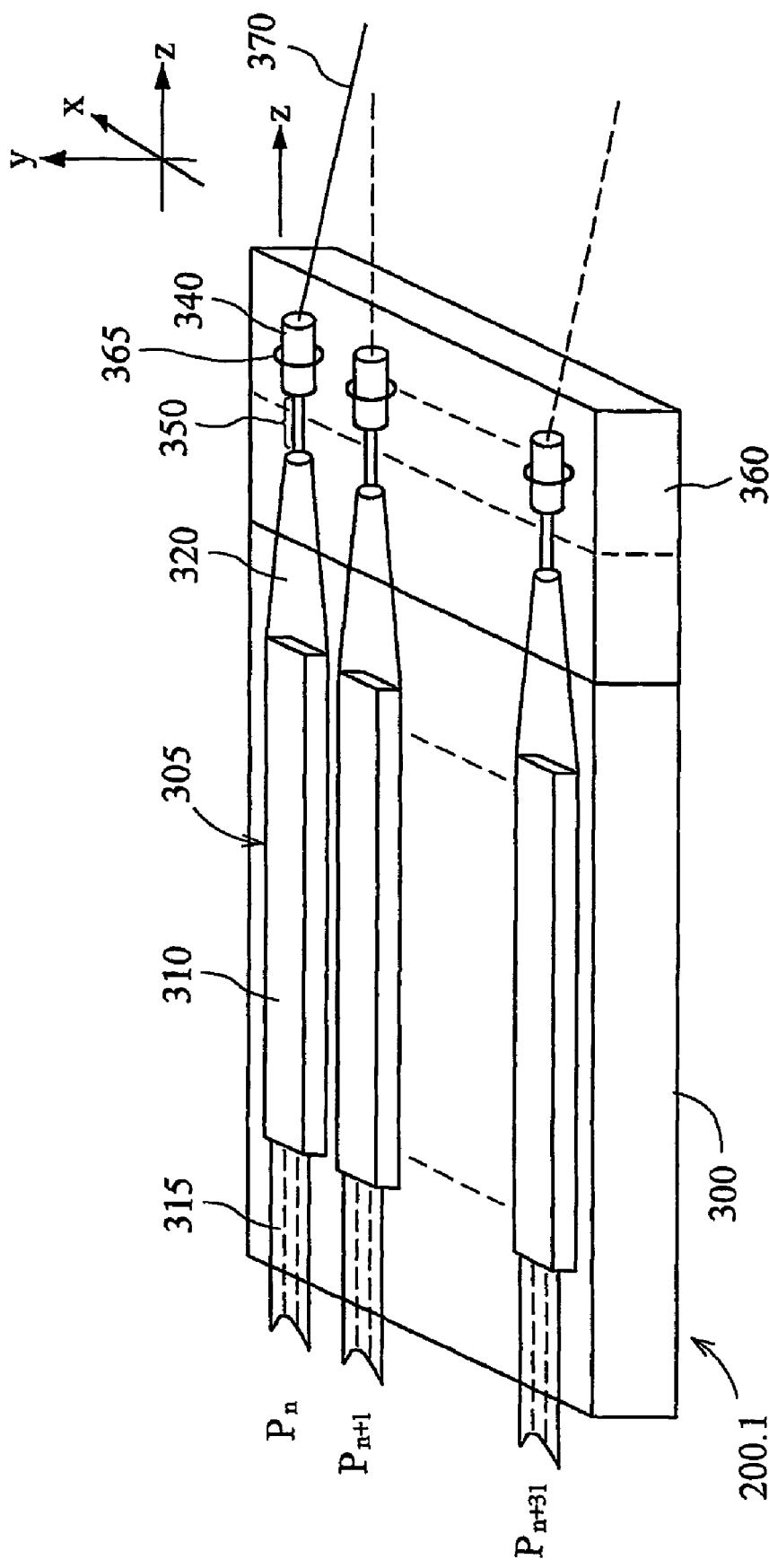
FIG. 5 is a diagram of one of the slices in FIG. 3.

By mounting the collimator 40 in a gimbals type mount 42 that allows the collimator 40 to pivot about its centre point as shown in FIG. 5, and by steering the beam through angular swing of the collimator at the end of the fibre optic, important advantages are secured. The working volume around each fibre is considerably reduced, as compared with previous arrangements which move the end of the fibre in translation. The physical beam deflection that can be achieved compares well with that achievable through previous techniques which move the collimator with respect to the fibre. The optical losses that are inherent in separate fibre and collimator arrangements are however avoided in this aspect of the present invention.

Returning now to description of the slices 200, reference is directed to FIG. 5 which shows the slice 200.1 in greater detail. This comprises a housing 300 which provides the support structure for a parallel array of thirty-two beam steering arrangements, for example that indicated at 305. The beam steering arrangement 305 comprises an elongate actuator 310 which extends along the Z axis. The actuator 310 is mounted at its first end rigidly in the housing 300 and is free to move relatively to the housing at its second end. A frusto-conical lever 320 extends rigidly from the second end of the actuator. The actuator member 310 is a laminate comprising a stack of layers of piezoelectric material interspersed with electrode layers. The piezoelectric material layers preferably comprise PZT ceramic polarised such that the application of appropriate actuation signals to the electrode layers causes the actuator 310 to flex in the X- and Y-directions shown in FIG. 5. The electrode layers may be of silver, aluminium or, ideally platinum, permitting higher firing temperature, although other materials are of course possible. The electrode layers are alternately connected in parallel such that moderate bias potentials (typically +/−45 volts) applied via the electrodes to the piezoelectric layers (via the control system 20 shown in FIG. 1) are sufficient to create the required electric fields. The design of such piezoelectric laminates is well known from a variety of other fields.

The second end of the actuator member 310 being substantially unrestrained is free to move when the member 310 is flexed. The actuator 310 is preferably of rectangular cross-section and has a length in a range of 20 mm to 40 mm, preferably 25 mm to 30 mm, and has a side width in the order of 1.8 mm. More preferably, the actuator 310 is of substantially square cross-section. The actuator 310 has an axial bore for accommodating an optical fibre 315.

The actuator lever 320 is also hollow, again to accommodate the optical fibre. The hollow, tapered form of the actuator lever 320, the material of which it is made (for example carbon fibre) and the material thickness are selected to have high stiffness and as low mass in order to render their flexural mode resonant frequency as high as possible, namely their first-order Eigenmode frequency. The actuator lever 320 preferably has a length in a range of 25 mm to 75 mm, although a length of substantially 60 mm is more preferable.

Each beam steering arrangement of the slice 200 is provided with an associated optical fibre for coupling an optical port of the actuator to the associated collimator. For example, the actuator 305 carries the optical fibre 315 which is connected at its first end to an optical port $P_n$ associated with the actuator 305, where n is an integer, and at its second end to a collimator 340. The fibre 315 is routed along the axial bore of the actuator member 310 and through a hollow central region of the actuator lever 320. The fibre 315 extends beyond the actuator lever 320 for an exposed region 350 in the order of substantially 2 mm before finally terminating at a first end of a tubular collimator 340. The fibre 315 is attached to the collimator 340 preferably by fusion welding; as an alternative to fusion welding, substantially optically transparent ultra-violet (UV) radiation curable adhesive can be used to bond the fibre 315 to the collimator 340.

The fibre 315 is preferably monomode optical fibre (eg SMF-28 by Corning) having an external diameter—including its acrylic primary coating—of substantially 250 µm. (10 µm core, 125 µm diameter glass cladding) Alternatively a thinner polyamide coating (Lucent) may be used giving an external diameter of 160 um, which has advantage of the stiffness of the fibre being less dependant on temperature, and needing a smaller hole in the actuator if this approach used. Even better, diamond coated fibre (3M Inc) have an OD of 127 µm and very stable mechanical properties. It will be appreciated therefore that a single uninterrupted length of optical fibre links the optical port $P_n$ associated with the actuator 305 to the collimator 340 of the actuator 305; use of such an uninterrupted length is important in minimising optical insertion loss.

Collimators associated with the actuators of the slice 200 are disposed in a linear array 360, each collimator being supported in the housing 300 by an associated gimbal 365, taking the form broadly shown in FIG. 4. Thus the collimators are restrained by the gimbals to pivot in orthogonal axes X and Y to steer the emerging beam, with the gimbals substantially preventing lateral translation of the collimators and also allowing only that small Z movement necessary to accommodate thermal length changes between the base (300) and the actuator/lever assembly (310/320), and $2^{nd}$ order shortening of the actuator lever collimator linkage at larger deflection angles.

In operation, flexure of the PZT actuator 310 causes its free end, and thereby the actuator lever 320, to move in the XY plane. This movement, amplified by the mechanical advantage of the lever, is communicated to the collimator through the short region 350 of exposed fibre between the narrow end of the lever and the collimator. In this way, the collimator is rocked to the precise, required angular extent about the X and Y pivot axes.

It will be noted that in the beam steering process, the actuator operates on the fibre, with the fibre operating on the collimator. This approach has a number of advantages. First, it preserves the axial symmetry of the actuator and the actuator lever, which are both coaxial and cylindrical about the Z axis of the fibre and collimator. This symmetry distributes the required structure, in the most space efficient manner for a 2D array of beams. Symmetry is also extremely useful in eliminating the resonances and harmonics that can be troublesome with densely packed mechanical parts excited at high frequencies. A further advantage of using the fibre as the "drive connection" with the collimator, is that the all influences upon the critical dynamic behaviour of the collimator are eliminated, except for the gimbal which is expressly designed for the purpose, and the fibre itself.

It will be appreciated that the fibre 315 in the exposed region 350 is bent when the collimator 340 is steered in off-axis directions Operation of the slice 200.1 will be briefly summarised.

Input optical radiation from external devices (not shown) is received at the various input ports (such as $P_n$) and is guided along the associated fibre to the corresponding collimator 340 from which is output a substantially collimated beam of radiation 370. Actuation signals from the control system 20 are applied to the actuator 310 to cause it to flex, the actuator lever 320 providing mechanical magnification of such flexure of at least 2:1 and preferably at least 5:1. The flexure causes the fibre 315 in the exposed region 350 to bend and thereby cause the collimator 340 to tilt within its gimbal 365. Thus, by flexing the actuator member 310 and its associated spacing member 320, corresponding changes in steering direction of the beam 370 are provided.

As will be described later, parts of each slice 200 can be implemented in the form of silicon micromachined components, such components also being referred to in the technical field of the invention as MEM's components. For example, although the actuator lever 320 is described in the foregoing as being manufactured from carbon fibre material, it can alternatively be manufactured from micromachined silicon or micromachined diamond. Single crystal silicon is a strong light-weight material which exhibits almost perfect elastic properties and is not susceptible to work-hardening on account of an absence of grain boundaries therein. Microfabrication of the actuator lever 320 will be described later.

Likewise, the gimbals in the array 360 can be similarly microfabricated in a silicon-based material system, for example from silicon nitride or from diamond substrates. Microfabrication of the gimbal 365 will be described later.

The actuators 310 in the slice 200 can be fabricated and assembled into the slice 200 as individual items. Alternatively, the actuator members of the slice 200 can be fabricated as a unitary comb-like assembly.

Figure 6:
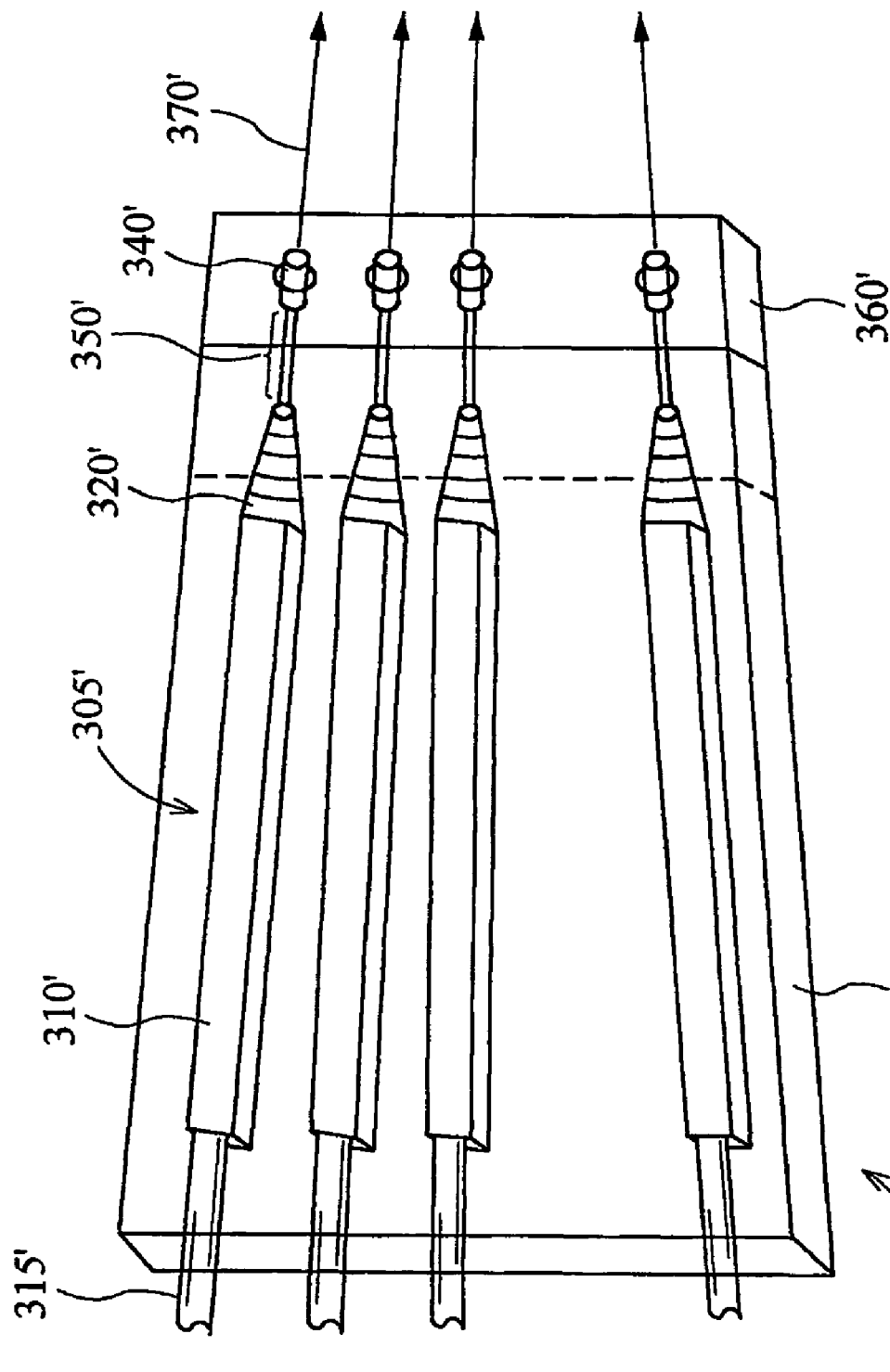
FIG. 6 is a diagram similar to FIG. 5, illustrating a modified slice with a radial array of actuators.
Figure 7:
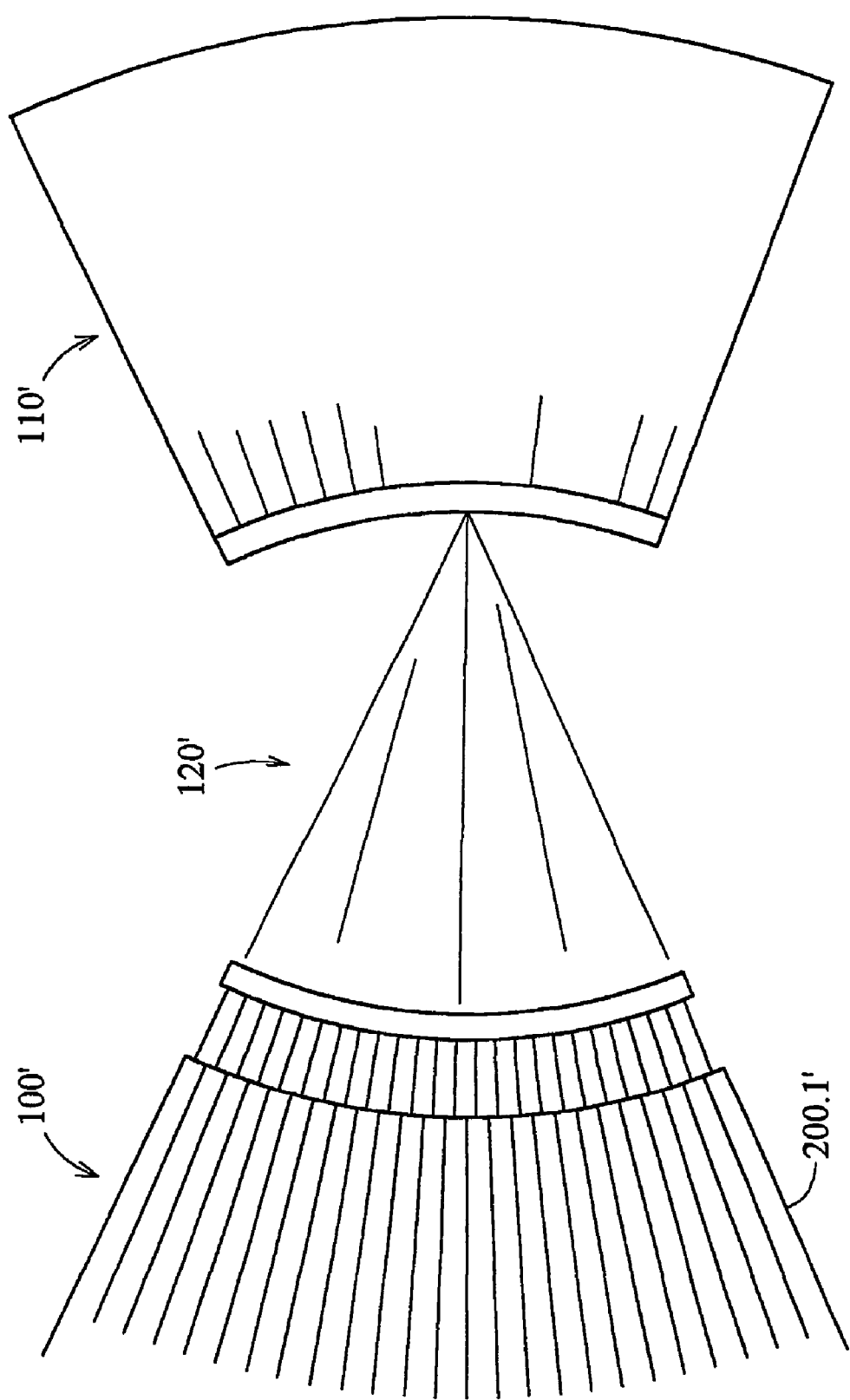
FIG. 7 is a diagram illustrating the orientation in input and output arrays of the modified slice of FIG. 6.

Referring now to FIG. 6, there is shown a modified version of the slice 200, with the component parts taking the same reference numerals as in FIG. 5, with primes. In the modified slice 300', actuators 310' are arranged not parallel to each other, but in a radial array. As shown diagrammatically in FIG. 7, the longitudinal axes of the actuators in each slice 200' of the input array are directed substantially towards the central actuator of the opposed slice 200' in the output array 110'.

In this modification, the collimators operate to aim undeflected radiation at a centre fibre of an opposing array. Such a configuration minimises the need for additional deflection from optical systems in the deflection region 120'. An additional advantage of the modified structure is that a smaller range of angular movement at the collimator will suffice to steer a beam from any possible input to any possible output.

In the modified slice 200', the actuators can still be fabricated as a unitary comb structure, with a plurality of angled saw cuts now being required to define the radial array of actuators.

A preferred form for the gimbal which supports each collimator 340 (or 340') will now be described with particular reference to FIG. 8.

Figure 8:
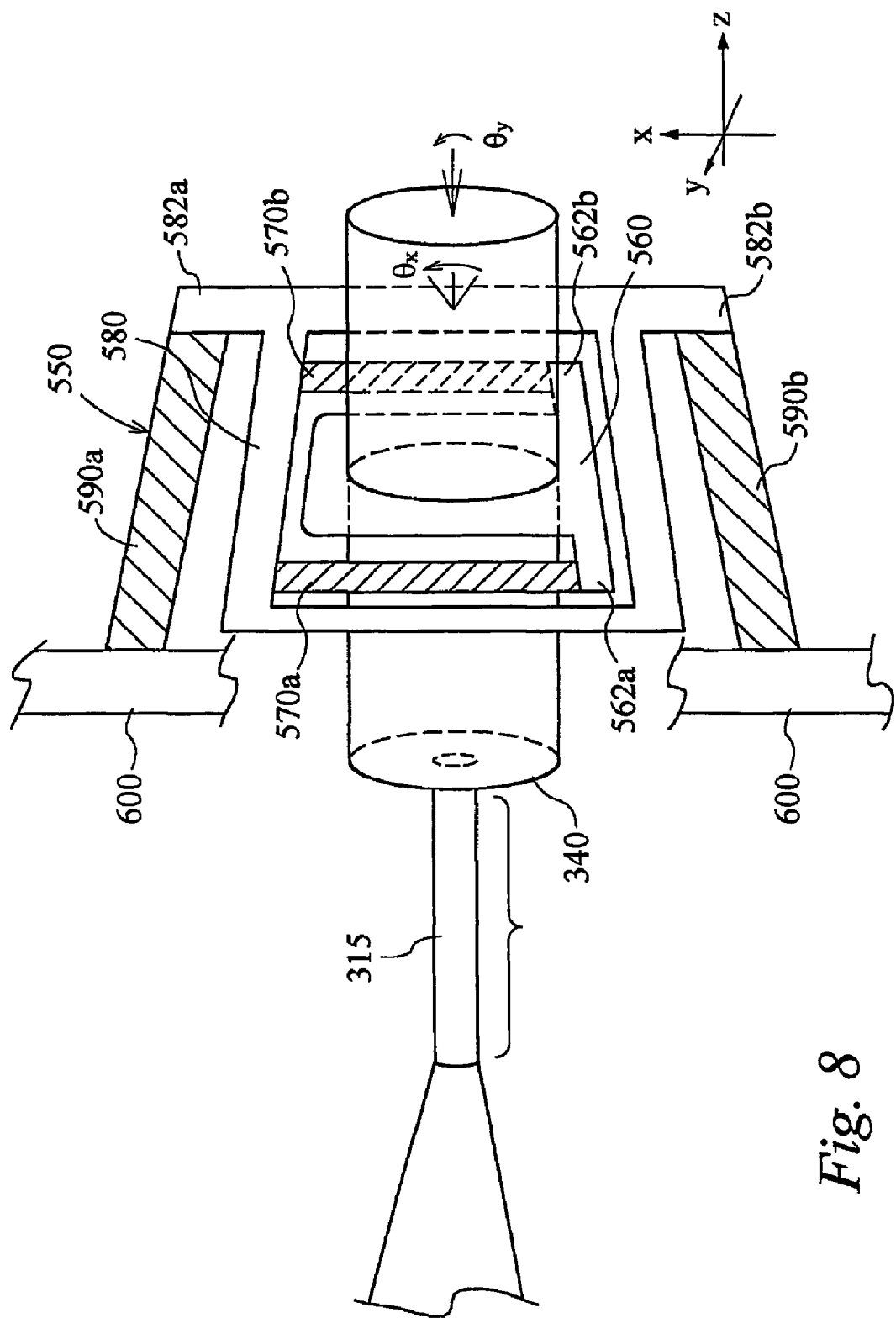
FIG. 8 is a schematic diagram of a gimbal together with its collimator and optical fibre associated with each actuator member of the structure in FIG. 3.

In FIG. 8, there is shown a collimator 340 attached at a central region thereof to its associated gimbal 550. The collimator 340 is a graded index optical part of substantially cylindrical form (or of plane glass with refractive lens ground onto end), having a first end at which, in operation, a collimated beam of radiation emerges, and a second end to which the fibre 315 is fusion welded. (supplied by for example Lightpath inc, Albuquerque). If required, strain relief can be provided at the fusion weld; such strain relief can comprise a meniscus of adhesive applied to the second end of the collimator 340 and the fibre 315, for example UV-curable substantially transparent optical grade adhesive available from Norland Inc., USA, or the second end of the collimator 340 can be partially recessed to provide more mechanical support for the fibre 315.

The gimbal 550 is a flat, metallic structure formed using photolithographic and metal plating techniques. Preferably, the gimbal 550 is fabricated from nickel. The gimbal comprises a central substantially square-shaped planar region 560 having a central round hole for receiving the collimator 340. At one edge of the region 560, two ears 562a, 562b project from opposite corners, the ears 562a, 562b being substantially in the same plane as the central region 560. The central region 560 and the ears 562a, 562b are nominally in a range of 60 µm to 140 µm thick, although they are preferably substantially 100 µm thick. Attached to the ears 562a, 562b are first and second flexural members 570a, 570b respectively as illustrated. The flexural members 570a, 570b are preferably in a range of 10 µm to 30 µm thick, more preferably substantially 20 µm thick, and in a range of 80 µm to 300 µm wide, more preferably substantially 200 µm wide. The first and second flexural members 570a, 570b are each substantially in the order of 1.5 mm long. Moreover, the flexural members 570a, 570b are preferably parallel and in the plane of the central region 560. Ends of the flexural members 570a, 570b remote from the ears 562a, 562b are connected to a hollow, rectangular frame 580 accommodating the members 570, the ears 562 and the central region 560. The frame 580 is nominally in the same plane as the central region 560. The frame 580 is preferably in a range of 60 µm to 140 µm thick, more preferably 100 µm thick, and its frame edge width is nominally in a range of 100 µm to 300 µm wide, more preferably substantially 200 µm wide. At a peripheral edge of the frame 580, the peripheral edge of the frame 580 being nominally orthogonal to the aforesaid peripheral edge of the central region 560, there are provided two ears 582a, 582b at opposite corners of the edge. The ears 582a, 582b are nominally in the same plane as the central region 560. Extending from the ears 582a, 582b are third and fourth flexural members 590a, 590b respectively connected at their ends remote from the ears 58a, 582b to a mechanical ground plane region 600. The ground plane region 600 and the flexural members 590a, 590b are nominally in the same plane as the central region 560. The third and fourth flexural members 590a, 590b have associated longitudinal axes which lie orthogonally to those of the first and second flexural members 570a, 570b. The flexural members 590a, 590b are preferably the same as members 570a and 570b.

The flexural members 570a, 570b, 590a, 590b are thinner than they are wide and therefore substantially resist lateral translation of the central region 560 relative to the mechanical ground plane 600 when the collimator 340 is steered by virtue of translation of the fibre 315. The flexural members 570a, 570b, 590a, 590b bend readily in the Z-axis direction as shown in FIG. 8. The first and second flexural members 570a, 570b flex in the Z-direction to allow the collimator 340 to rotate in the X-direction. The third and fourth flexural members 590a, 590b flex in the Z-direction to allow the collimator 340 to rotate in the Y-direction as illustrated. The centres of the flexural members ideally lie on the X and Y axes through the centre of the collimator Although the gimbal 550 is described as being fabricated from a metal or metal alloy, it will in certain applications be more preferably micromachined from a monocrystalline material such as silicon or from silicon nitride which have superior mechanical characteristics and stability in comparison to metals. Such enhanced stability arises on account of the substantial absence of grain boundaries in monocrystalline silicon and silicon nitride. Other materials can be used for fabricating the gimbal 550, for example silicon carbide or even monocrystalline diamond. A microfabricated version of the gimbal 550 will be described in more detail later.

It will be appreciated that collimated radiation beams within the switching system 40 have to be steered to a high degree of accuracy, typically in the order of 0.01° pointing accuracy in a compact 1024 by 1024 optical switch. Moreover, this accuracy will typically require to be maintained over substantial periods of time and significant environmental variations, not all of which can be excluded by the switch enclosure and mounting.

The use—in accordance with various aspects of this invention—of a solid state transducer, an actuator arrangement which is radially symmetric about the fibre, a rocking collimator and a gimbal operating through bending or flexure, all contribute to substantially increased accuracy, stability and resistance to drift. Periodic recalibration of the actuating signals required to align a particular collimator in the input array with a particular collimator in the output array, may be of assistance. However, in the most demanding applications, some form of dynamic feedback in the beam steering process will likely remain necessary.

A most reliable indication of a collimated beam direction is the angular orientation of a collimator, for example through monitoring angular orientation of the collimator 340 relative to the housing 300. This has the important advantage of not requiring sampling of the beam itself and not requiring secondary beams which track the orientation of the primary beams for position feedback. These prior art approaches, whilst capable of high accuracy, carry the risk of attenuation or contamination of the primary beams unless complex and space-consuming design features are included in the optical pathways.

Thus, in order to improve steering accuracy of collimated beams within the switching system 40, embodiments of the present invention utilise feedback loops taking information from the instantaneous angular positions of the collimators to derive the actuation signals necessary to effect a desired beam deflection. Angular orientation of the collimators can be sensed using a variety of types of sensors. Capacitive sensing is especially preferred as it has sensing characteristics which are:

(a) substantially invariant with temperature provided that dimensional stability is maintained and excitation signals are maintained constant in amplitude and frequency; and (b) capable of multiplexing to simplify the electrical interconnections.

Figure 9:
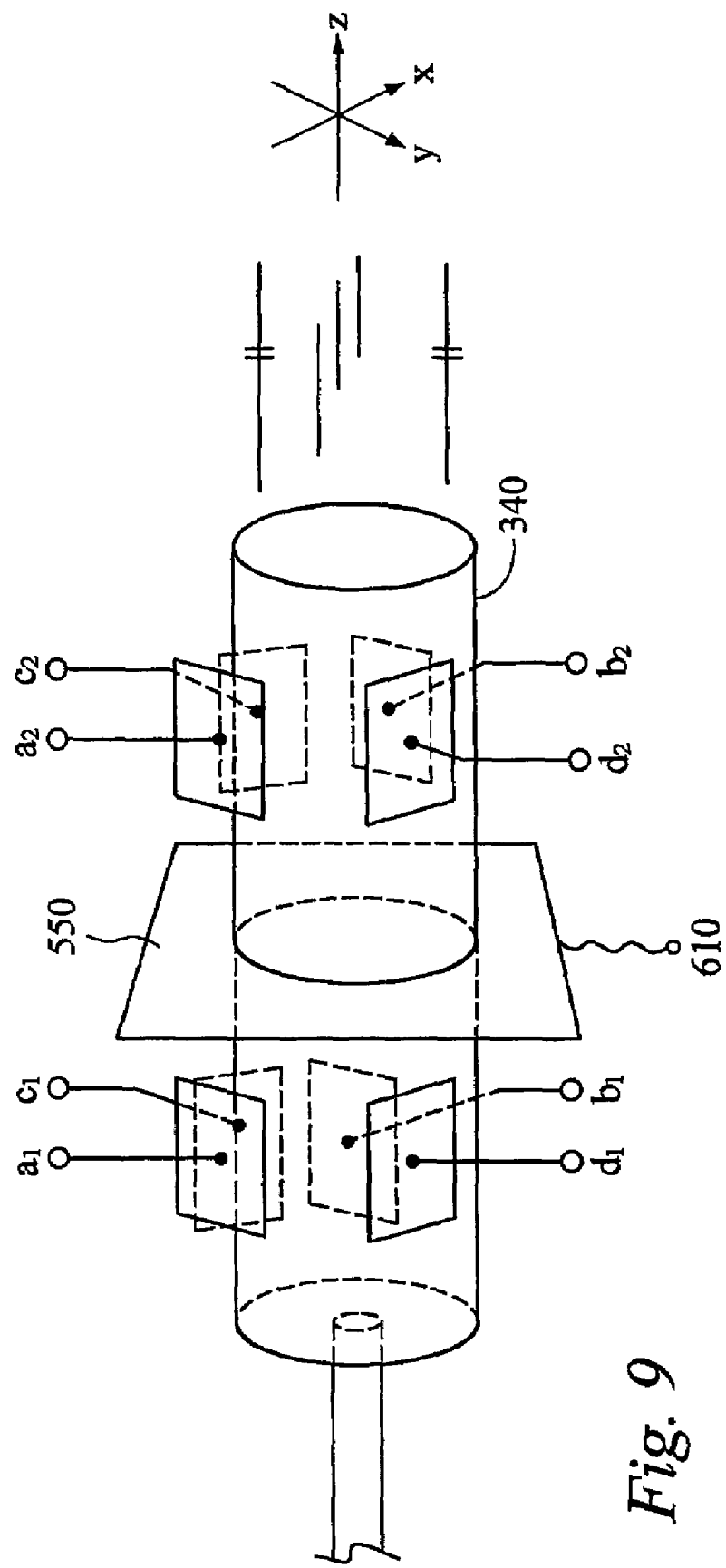
FIG. 9 is an illustration of an eight-plate capacitive angular position sensor configured around the collimator shown in FIG. 8.
Figure 10:
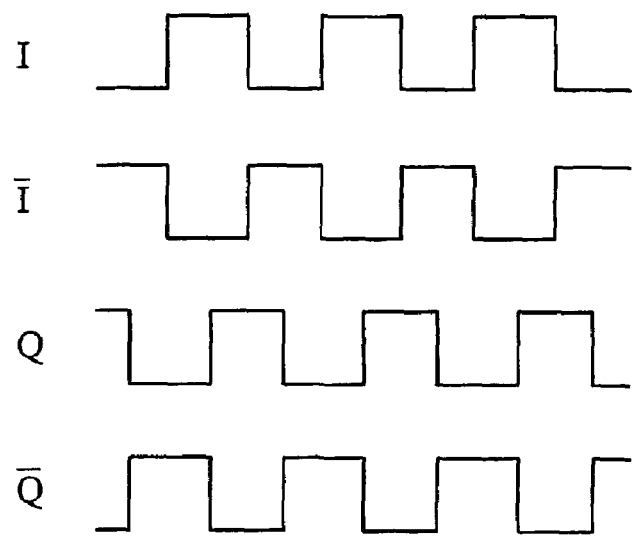
FIG. 10 is a diagram of the angular position sensing circuit utilising four of the capacitive plates shown in FIG. 9.
Figure 10:
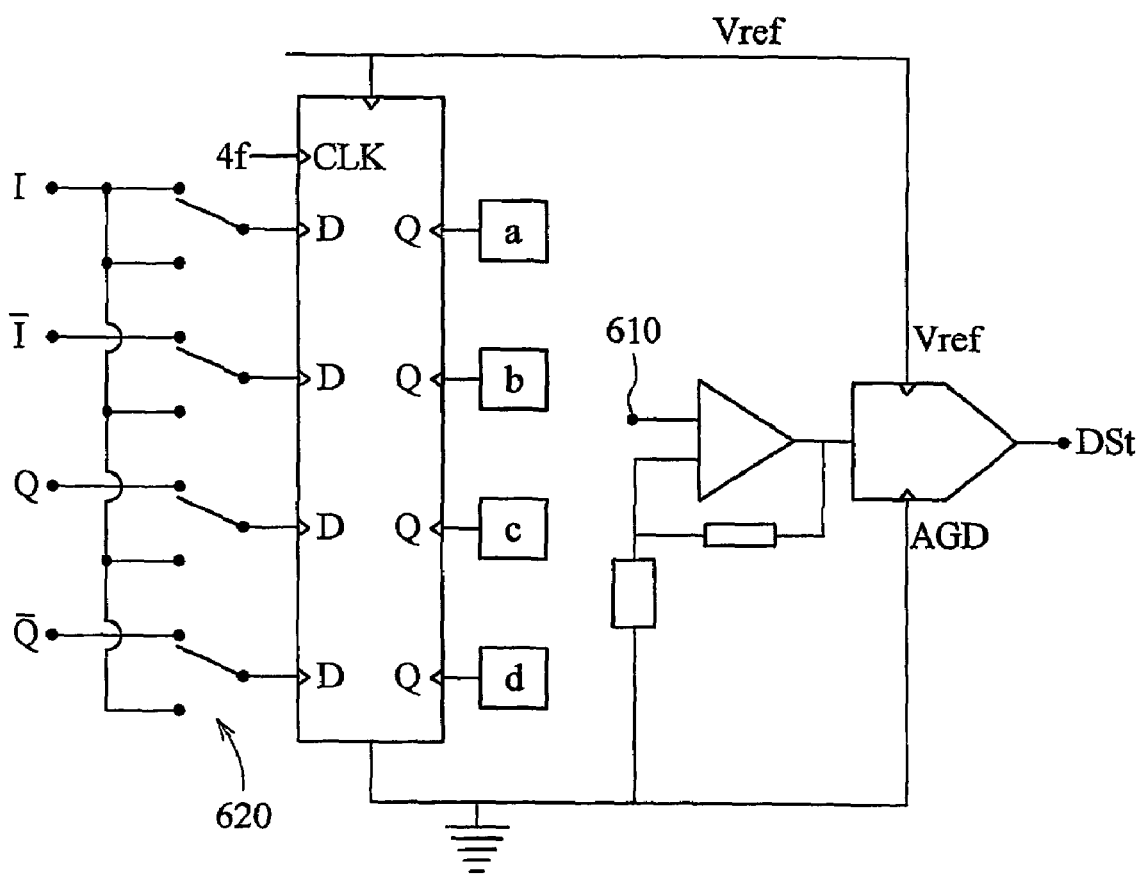

A capacitive sensor and its associated sensing circuit for determining the angular position of the collimator 340 as shown in FIG. 8 will now be described with reference to FIGS. 10 and 11. In FIG. 9, there is shown the collimator 340 with its associate gimbal 550, four capacitive plates denoted by "a1", "b1", "c1", "d1" positioned substantially equispaced symmetrically about one axial end of the collimator 340 and a further four capacitive plates denoted by "a2", "b2", "c2", "d2" positioned substantially equispaced symmetrically about the other axial end of the collimator.

The two sets "1" and "2" of capacitive plates are identical and only one will be described in what follows.

The plates "a1" and "b1" are parallel, with the collimator 340 positioned substantially equidistantly therebetween as illustrated. Likewise, the plates "c1", "d1" are parallel with the collimator 340 positioned substantially equidistantly therebetween. The plates "c1", "d1" are mounted orthogonally to the plates "a1", "b1". The plates "a1", "b1" are arranged to sense movement of the corresponding end of the collimator 340 in the X-direction as shown in FIG. 9. The plates "c1", "d1" are arranged to sense movement of the end of the collimator 340 in the y-direction as shown.

By using both set "1" and set "2" of capacitive plates, a determination can be made of the XY position of both ends of the collimator and therefore of the angle subtended by the collimator to both the X and the Y axes. The position determination can either be done independently for both ends, giving a check on the gimbal integrity; or more simply by cross connecting electrode set 1 and 2 (ie c2 to d1, d2 to c1, b2 to a1 and a2 to b1). In an alternative arrangement, the gimbal is relied upon to constrain the collimator to strict rotation about the X and Y axes (with no translational movement within the required precision of measurement) and the angle subtended by the collimator to both the X and the Y axes is inferred from a determination of the XY position of only one end of the collimator.

A capacitance C developed between the collimator 340 and each of the capacitance plates can be calculated approximately from Equation 1:

$$C = \epsilon_0 \epsilon_r A_{eff}/d \qquad \text{Eq. 1}$$

where $\epsilon_0$=absolute permittivity of free space ($8.854 \times 10^{-12}$ F/m);

$\epsilon_r$=relative permittivity of medium between the plate and the collimator 340 (namely air or dry nitrogen, $\epsilon_r$=1.00);

$A_{eff}$=an effective interfacing areas presented (approximately equal to half the area of the plate surface directed towards the collimator 340); and d=a gap distance between the plate and the collimator 340.

In one embodiment, the plates "a1" and "b1", are connected through charge amplifiers to non-inverting and inverting inputs respectively of a first differential amplifier (not shown) providing a corresponding output signal $V_X$. Likewise, the plates "c1" and "d1" are connected through charge amplifiers to non-inverting and inverting inputs of a second differential amplifier to provide a corresponding output signal $V_Y$.

The collimator 340 is provided with an electrode coating. This may be a metallic cladding forming part of the collimator structure or may be a dedicated electrode arrangement. A connection 610 is conveniently made to this collimator electrode through the gimbal 550 and the collimator is—in one embodiment—excited with a sinusoidal excitation having an amplitude $V_E$. Thus, the signals $V_X$ and $V_Y$ can be determined from Equation 2 and Equation 3:

$$V_X = (V_E \epsilon_0 \epsilon_r A_{eff}/C_f)[(d_a - d_b)/(d_a d_b)] \qquad \text{Eq. 2}$$

$$V_Y = (V_E \epsilon_0 \epsilon_r A_{eff}/C_f)[(d_c - d_d)/(d_c d_d)] \qquad \text{Eq. 3}$$

where $d_a$=a distance from the collimator 340 to the plate "a1";

$d_b$=a distance from the collimator 340 to the plate "b1";

$d_c$=a distance from the collimator 340 to the plate "c1"; and $d_d$=a distance from the collimator 340 to the plate "d1".

As the excitation signal is a substantially sinusoidal signal, for example a sinusoidal signal having a frequency in a range of 20 kHz to 100 kHz, more preferably substantially 50 kHz. The output signals $V_X$, $V_Y$ are also sinusoidal signals of frequency similar to the excitation signal.

It will be seen from inspecting Equations 2 and 3 that $V_X$ and $V_Y$ will be of a substantially zero amplitude when the collimator 340 is positioned equidistantly from the plates "a1", "b1", "c1", "d1".

For small deflections of the collimator 340 off-axis from a central position, Equations 2 and 3 indicate that approximately linear sensing of the position of the collimator 340 is achievable. For larger deflections, the sensor becomes non linear, but entirely useable, as the measured voltages still map onto coupled positions.

In operation, the control system 20 receives routing instructions from an external device and refers to a stored calibration lookup table which associates optical ports to be connected with steering angles of collimators and thus with desired values of $V_X$ and $V_Y$ for each of the actuators of the assembly 10 associated with the ports to be connected. The control system 20 proceeds to actuate its actuator members 310 until desired values for $V_X$, $V_Y$ for the actuators are achieved. This iterative process might start from preliminary X and Y actuation signals associated with each desired collimator angle in the calibration process.

An alternative and preferred sensing methods, again using one or both sets of the capacitive plates shown in FIG. 9, will now be described with reference to FIG. 10.

In this arrangement, the plates a, b, c and d are excited and a measurement signal taking from the collimator electrode through terminal 610. A single set of electrodes or two cross connected sets either side of the gimbal can be used as described earlier. Four square-wave plate excitation signals are generated as shown in FIG. 10. Signals I and Q are in quadrature, and their respective inverted forms are also available. These signals are applied to the plates, not directly, but through a ganged switch arrangement 620 and a set of D-type flip-flops 630. The switch arrangement has two states: a first state in which the four different drive signals are connected to the D inputs of the respective flip-flops, and a second, calibration state in which the single drive signal I is connected to all four flip-flops. The re-clocking operation performed by the flip-flops serves to increase the phase accuracy between the I and Q signals, preferably to within $10^{-4}$ radians. The flip-flops are clocked at 4 f, where f is the excitation frequency.

The collimator signal is taken through terminal 610 and a simple amplification stage 630 to a precision (preferably 12 bit) ADC. The digital output is taken to a digital signal processor (DSP) for analysis. It is an important feature of this circuit that the ADC and the flip-flops operate from the same ground and voltage reference rails. It is also important the flip-flop outputs are very low impedance and driven rail to rail.

The DSP generates a signal, the real and imaginary components correspond with X and Y position respectively:

$$S = \text{Average } [(1-3) + I(2-4)] \quad \text{Eq. 4}$$

where 1, 2, 3 and 4 represent consecutive time samples and the average is taken over any appropriate interval.

This signal is generated during both "measurement" and "calibration" states of the switch arrangement 620 and the values compared to give a position value:

$$\text{Position} = S_{measurement}/S_{calibration} \quad \text{Eq. 5}$$

This technique provides excellent stability against variations in amplifier sensitivity, changes in dielectric behaviour and voltage drift.

A self-checking or calibration facility may be provided with additional "dummy" collimators which have identical sensing arrangements to those described, but are rigidly fixed in pre-defined angular orientations within the housing.

There will now be described a modified gimbal construction.

Figure 11:
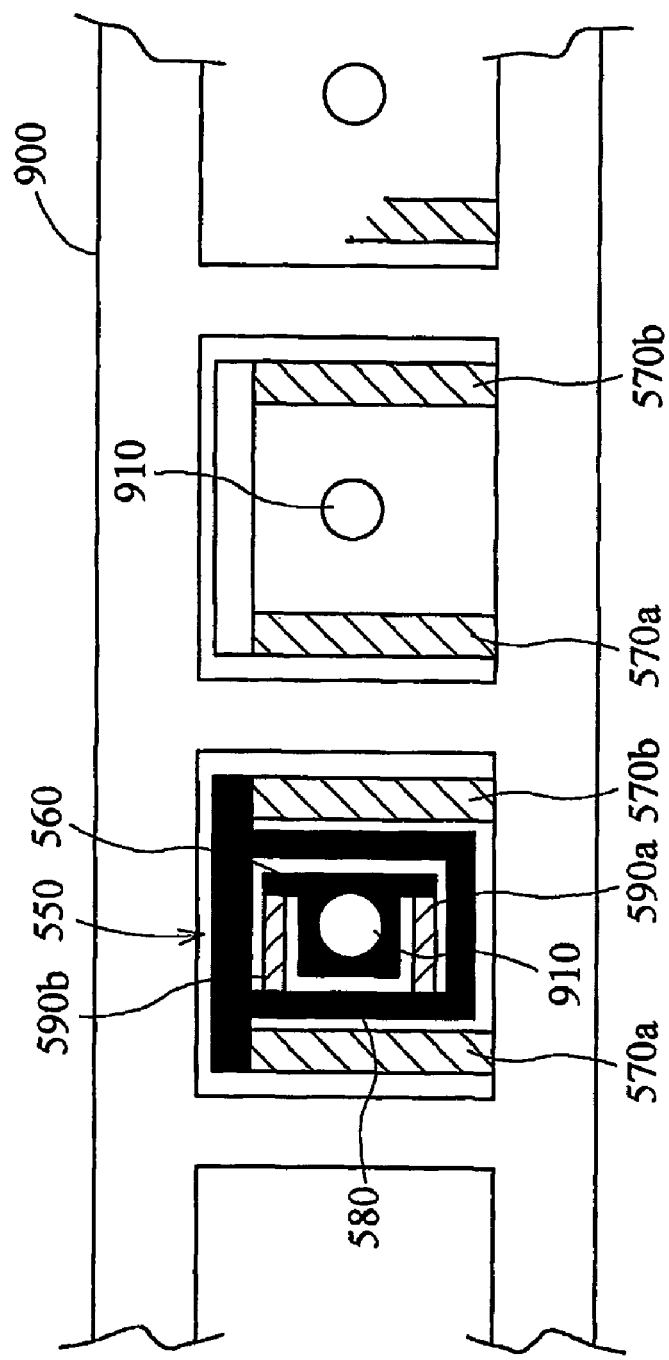
FIG. 11 is an illustration of an array of microfabricated gimbals.

FIG. 11 is an illustration of a linear array of gimbals 550 fabricated using micromachining technology (MEMs), the array indicated generally by 900. The flexural members 570a, 570b, 590a, 590b of the gimbal 550 are fabricated substantially from silicon nitride whereas regions connected thereto are fabricated from a combination of silicon nitride and silicon bulk layers. The gimbal 550 in the array 900 is preferably of substantially similar dimensions to the gimbal 550 illustrated in FIG. 8. The central region 560 includes a plano-convex lens 910 formed by epitaxial growth to form a collimator integrated into the array 900. Alternatively, the central portion 560 in FIG. 11 can include a micromachined round hole instead of the lens 910 for receiving the cylindrical form of collimator described previously.

Fabrication of the array 900 involves the steps of:
(a) providing a silicon wafer substrate;
(b) growing or depositing a layer of silicon nitride onto the substrate by vapour phase deposition;
(c) selective etching away the silicon substrate in a vicinity of where the flexural members 570a, 570b, 590a, 590b are to be formed; and
(d) delineating void regions to render the frame 580, flexural members 570a, 570b, 590a, 590b and the central region 560 of the gimbal 550 defined and free, such delineation preferably involving the use of reactive ion etching employing a magnetically contained plasma providing enhanced etch anisotropy.

If collimator lens structures are to be formed integrally into the array 900, a further deposition step is included between steps (b) and (c) above to form such lens structures.

Associated with fabrication steps (a) to (d) will be photolithographic steps, resist deposition steps, resist development steps, and stencil mask formation steps which are well known in the technical field of semiconductor fabrication. Microfabrication of the array 900 can also be performed in other material systems, for example in monocrystalline diamond.

When the gimbal 550 is microfabricated, such microfabrication allows strain gauges to be included for sensing strain induced in the flexural members 570a, 570b, 590a, 590b. Such strain gauge sensing can either be in addition to, or in substitution for, capacitive position sensing as illustrated in FIG. 10 The strain gauges are preferably formed from epitaxially grown doped polysilicon, which is capable of providing a gauge factor in the order of 3, or epitaxially grown doped monocrystalline silicon which can have gauge factors approaching several hundred for certain crystallographic orientations.

In operation, the strain gauges can be used:
(a) to sense steering direction of the collimators associated with the gimbals in the array 900; and/or
(b) to sense z-axis displacement of the gimbal 550 and therefore warn of potential imminent gimbal failure if excessive movement in the z-axis occurs; and/or
(c) to actuate via a feedback loop the actuator members equipped also with Z-axis direction actuation and thereby actively reduce translation of the collimator in the Z-axis direction to zero.

Figure 12:
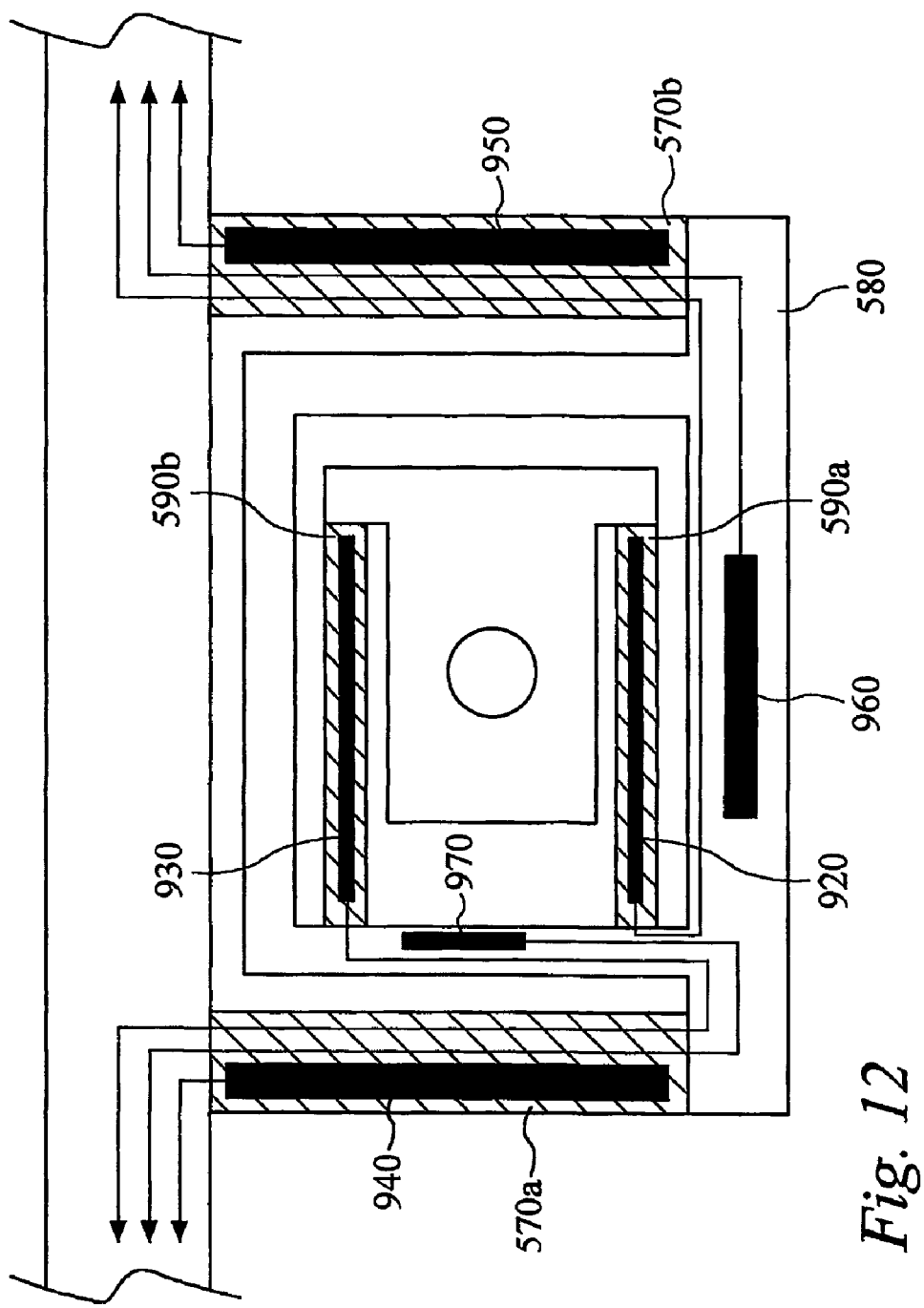
FIG. 12 is a schematic illustration of locations of strain-gauges on each of the gimbals in FIG. 11.
Figure 18:
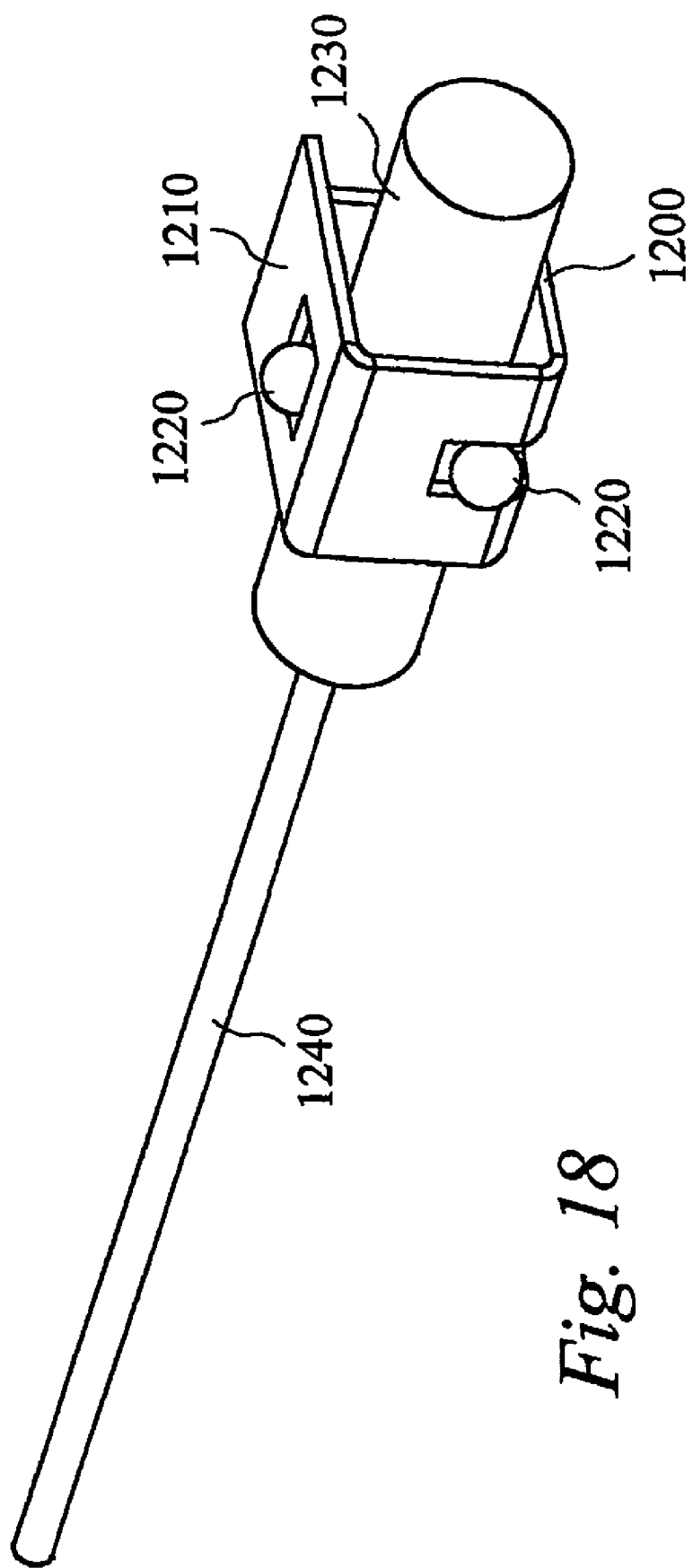
FIG. 18 shows an alternative embodiment of a gimbal employing bearings.

Referring to FIG. 12, the gimbal 550 in microfabricated form is illustrated complete with its strain gauges. The third and fourth flexural members 590a, 590b include along their length strain gauges 920, 930 respectively. Likewise, the first and second flexural members 570a, 570b include along their length strain gauges 940, 950 respectively. On the frame 580 there are included first and second compensation gauges 960, 970 which provide temperature sensing for compensating the strain gauges 920 to 950 for change in resistance with temperature. If required, the gauges 920 to 970 can be electrically connected in a Wheatstone-type bridge configuration; alternatively, the gauges 920 to 970 can be individually connected and therefore individually interrogated from the control system 20. Electrical connections are conveyed from the strain gauges along the flexural members where necessary as illustrated in FIG. 18. The electrical connections are eventually routed to contact pads at peripheral edges of the array 900. When the gauges 920 to 950 are substantially as long as their associated flexural members, they principally sense in operation bending of their flexural members and hence angular steering direction of their associated collimator. Conversely, if the gauges 920 to 950 are made considerably shorter than their corresponding flexural members, they can be used to generate a measurement signal sensitive to both z-axis direction movement of the collimator and steering angle of the collimator.

If required, combinations of shorter and longer strain gauges can be included in the microfabricated gimbal 550 illustrated in FIG. 11 and their signals mixed to provide z-axis sensing and collimator angle information independently.

Figure 13:
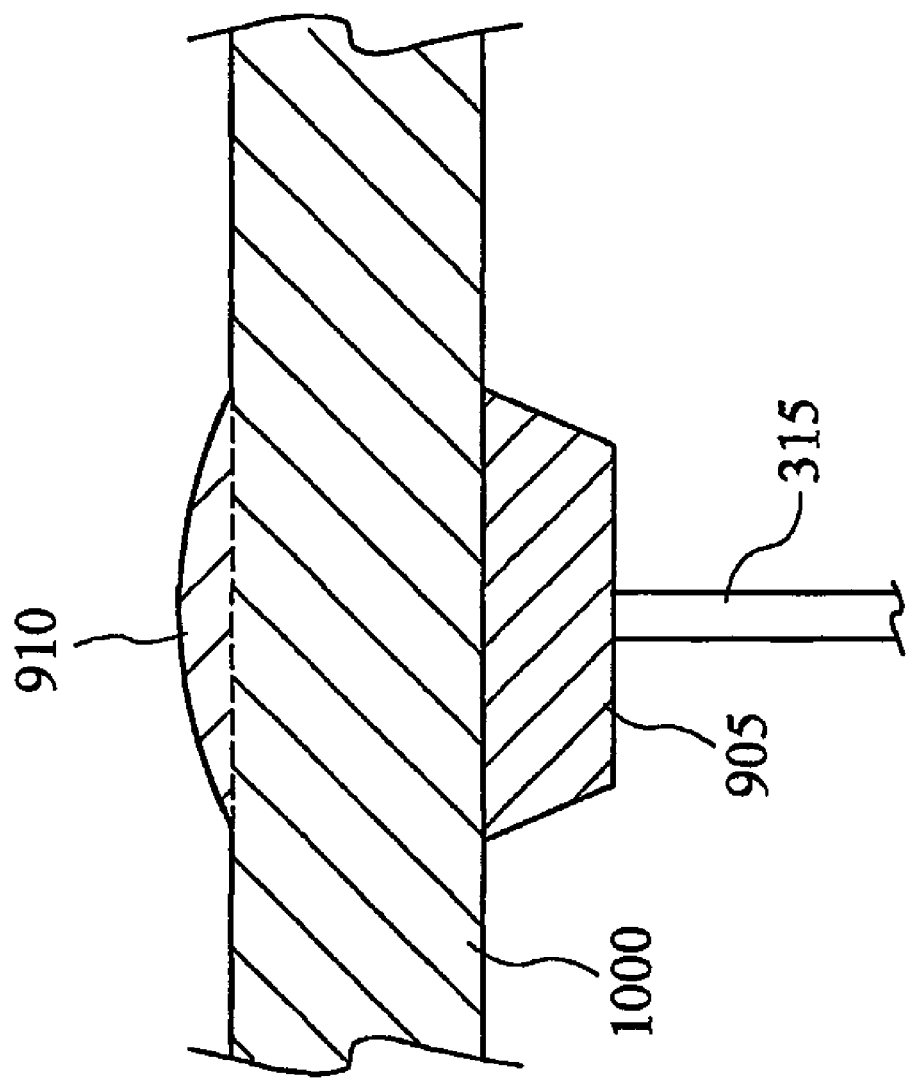
FIG. 13 is an illustration of a microfabricated collimator for use with the gimbals in FIG. 11.

Microfabrication of collimators into the microfabricated gimbal 550 in FIGS. 11 and 12 is illustrated in a cross-sectional view in FIG. 13. The fibre 315 in the exposed region 350 is fusion welded at 905 to a first face of a block of substantially optically transparent glass 1000, the block 1000 also including a second face substantially parallel to the first face. During assembly of the array 900, a second face of the block 1000 is bonded, for example using UV-curing substantially transparent optical adhesive, to an underside of the centre region 560. On an upper surface of the centre region 560 in FIG. 13, there is epitaxially formed the piano-convex lens 910. If required, laser or ion milling can be applied to the lens to trim its optical characteristics so that the lens 910 is capable of forming a precise collimated radiation beam.

An example will now be described of a piezoelectric actuator arrangement, referring to FIG. 14.

Figure 14:
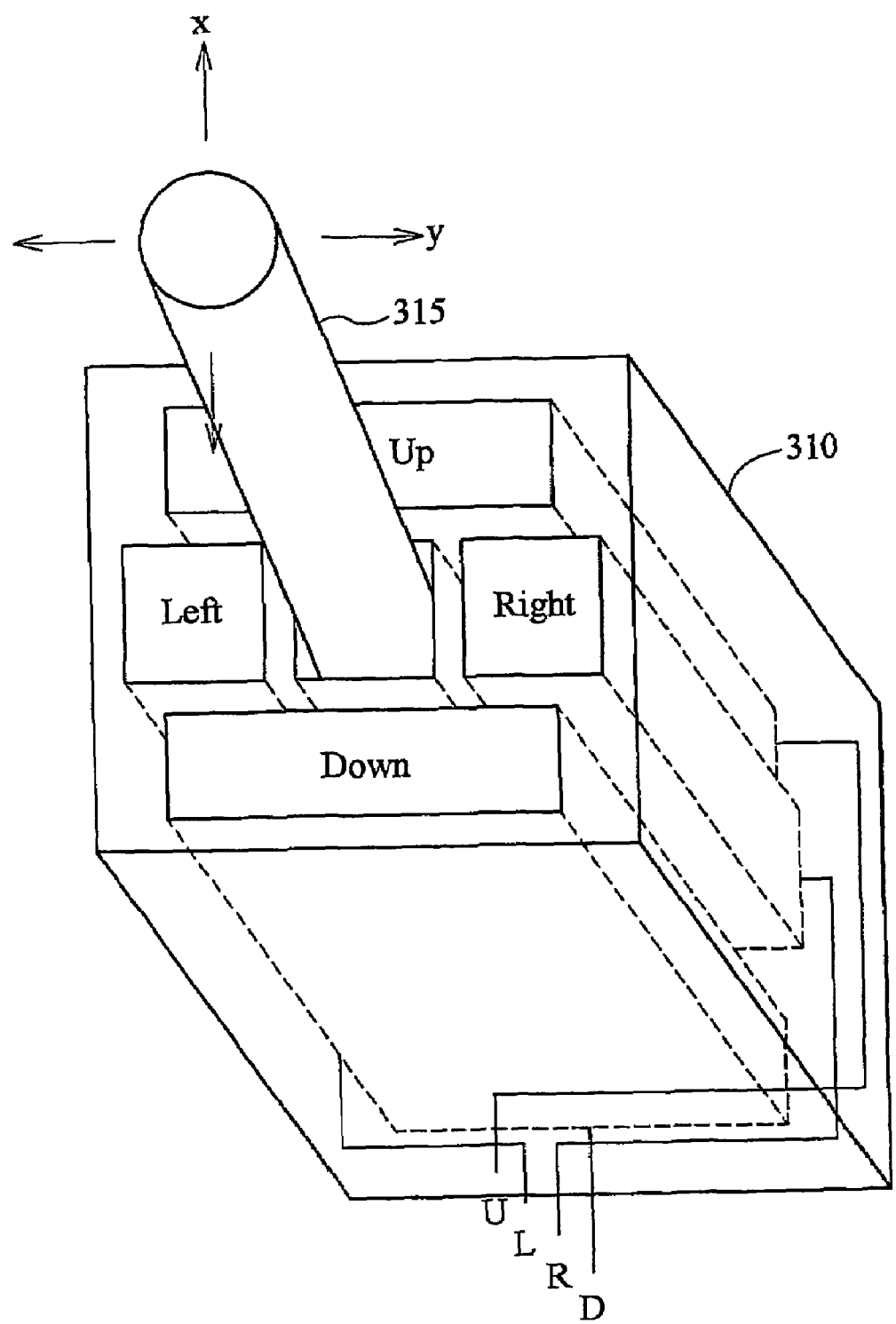
FIG. 14 shows schematically an electrode configuration for the actuator.

FIG. 14 shows a cylindrical piezoelectric actuator 310 of square cross section and having an axial bore (again of square cross section) accommodating the fibre optic 315. Electrodes positioned within the body of the piezoelectric material are shown diagrammatically in FIG. 14. Four electrodes are designated UP, DOWN, LEFT and RIGHT. If only UP is stimulated, the top part of the actuator as seen in FIG. 14 will contract and the entire actuator will bend towards the contracting part, thus moving the fibre position upwards, along the X axis. The same applies for each of DOWN, LEFT and RIGHT in their respective directions. The electrodes are stimulated by inputs U, L, R and D in FIG. 14, which correspond to UP, LEFT, RIGHT and DOWN electrodes respectively. For ease of organisation of the electronics, the electrode inputs are all positioned on the same side of the actuator. In the present embodiment, there are four electrodes which stimulate the piezoceramic actuator. In this case, the electrodes extend the whole length of the actuator; alternatively, the electrodes might stimulate only a section of the actuator.

Figure 15:
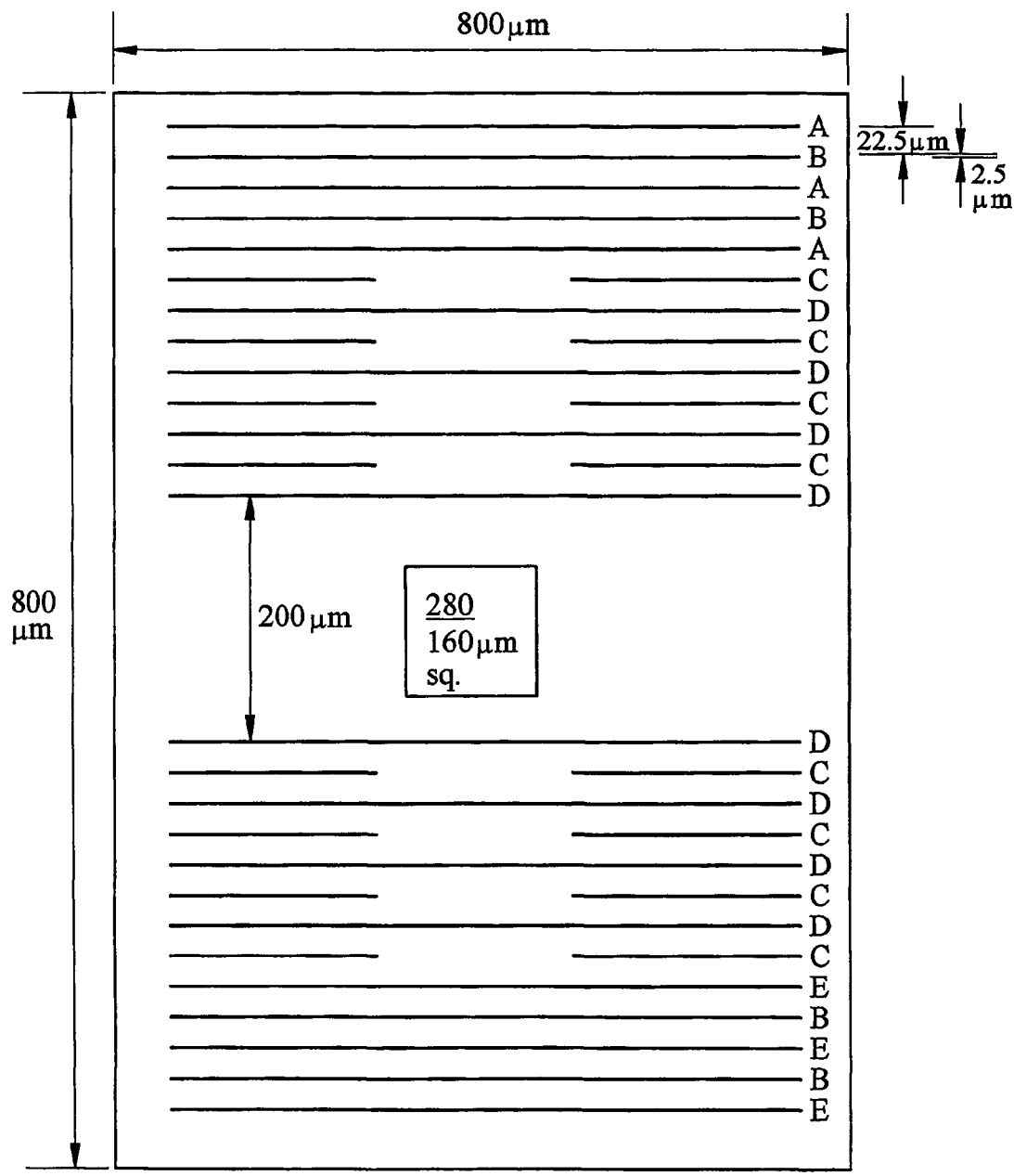
FIG. 15 is a sectional view of the electrode configuration of FIG. 14.

A specific and preferred monolithic-type piezoceramic block transducer is shown in FIG. 15; this may be manufactured by laying down layers of piezoceramic material with integrated electrodes.

It will be seen that towards the top of the actuator structure (as viewed in the figure), there are interleaved electrode layers A and B, extending across the width of the block. There are similar electrode layers E and B towards the bottom of the block. With all the B layers conveniently grounded, the application of a voltage to either A or E, will cause upward or downward movement, respectively. In this scheme, the drive voltages are unipolar and the polarisation is aligned parallel with the applied field such that the piezoelectric material reacts in contraction mode.

In the central region of the block are interleaved electrode layers C and D. The D layers extend across the width of the block, whilst the C electrodes are divided into left and right. Application of a voltage to the appropriate set of C electrodes will effect left or right deflection.

Figure 16:
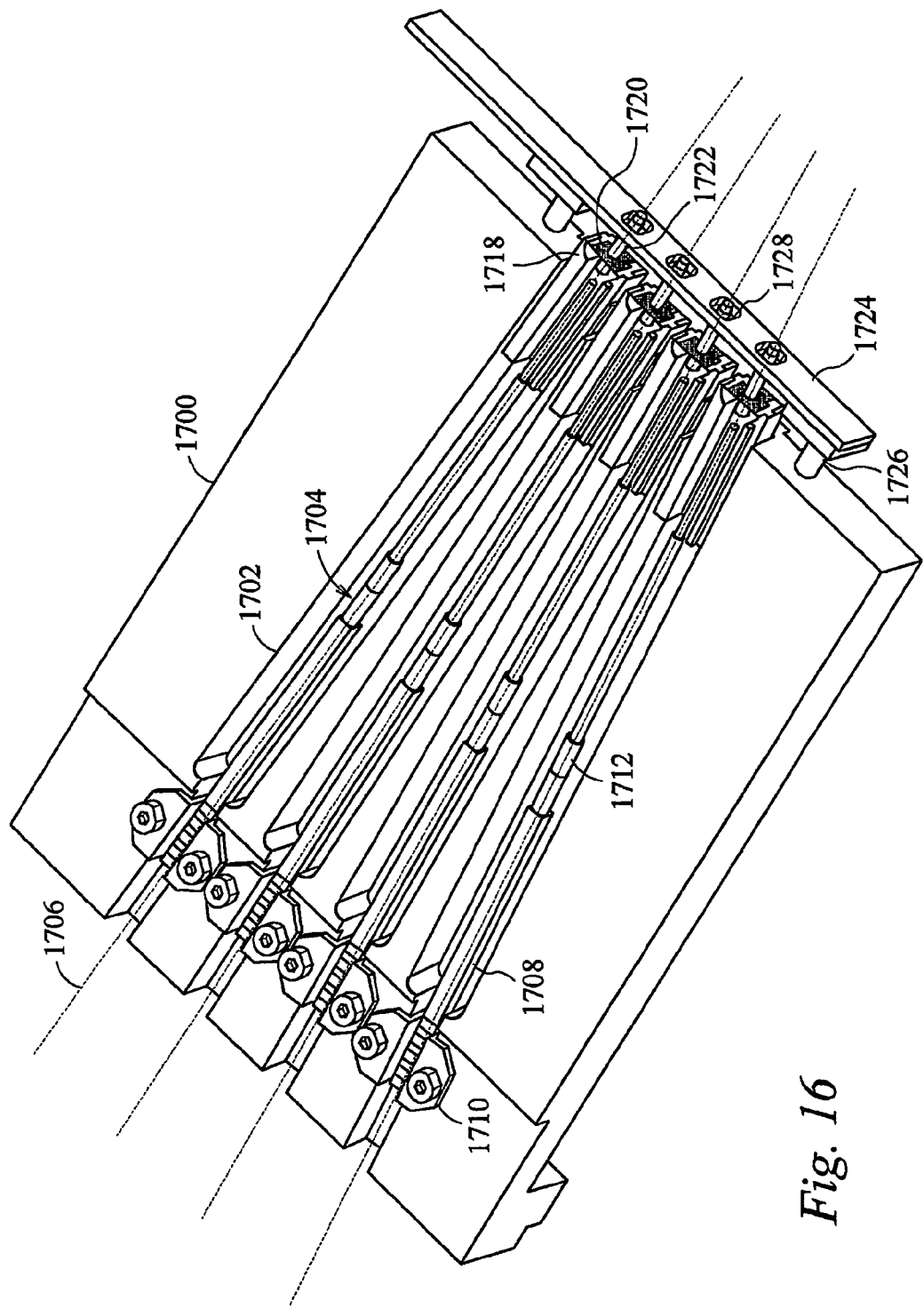
FIG. 16 is a perspective view of an optical switch component according to a further embodiment of the invention.

Reference is now directed to FIG. 16 which shows an optical switch component according to a preferred embodiment of the present invention. This embodiment draws upon the specific elements and features that have been previously described.

FIG. 16 shows a support plate 1700, into which are cut four radially converging slots 1702, each receiving a beam steering arrangement shown generally at 1704. The actual optic fibres are not shown in FIG. 16 but their location can be recognised from the beam paths shown in respective dotted lines 1706.

Elongate piezoelectric actuators 1708 are positioned in the respective slots, clamped at one end to the support plate through-clamps 1710. In the region of these clamps, the piezoelectric actuators are seen to carry terminals for external connection with the internal actuating electrodes.

From the free end of each piezoelectric actuator 1708, there extends a circular, hollow cylindrical lever 1712 which is longer than the actuator itself. The external diameter of the lever is stepped in regions from a relatively large diameter adjacent the actuator to a relatively small diameter at its free end. The lever may be formed of a wide range of metals or composites.

At the ends of the slots 1702 remote from the clamps 1710, there are positioned U-shaped channels 1718 which provide a rigid mounting for the respective gimbals 1720. These gimbals 1720 and the associated collimators 1722 can take any of the forms previously described.

A sensing bar 1724 is spaced from the support plate 1700 through pillars 1726 and has a series of apertures 1728 which receive the free ends of the respective collimators 1722. Positioned about each aperture 1728 are the capacitive sensing plates a, b, c and d of FIG. 9.

Figure 17:
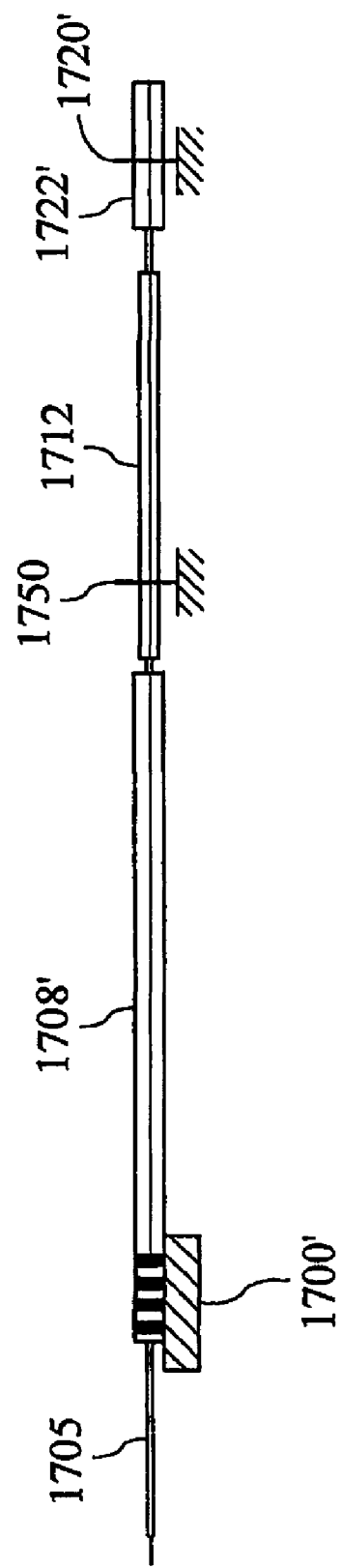
FIG. 17 is a scrap view illustrating a modification to the embodiment of FIG. 16.

A modification to the construction of FIG. 16 is illustrated diagrammatically in FIG. 17. The purpose of this modification is to improve the resistance of the structure to mechanical shock or vibration.

In this modification, the actuator 1708' is again clamped rigidly at one end to the support plate shown schematically at 1700'. The optic fibre 1705 again passes through the actuator 1708' and lever 1712' to a collimator and gimbal arrangement 1720'/1722' which is unchanged. The lever 1712', however, is not carried on the actuator but is instead carried on the support plate 1700' through a gimbal 1750. This new gimbal may for convenience take the same form as the collimator gimbal 1720 with the flexure element dimensions widened to 400 µm, shortened to 600 µm and the frame 580 suitably stiffened.

In operation, flexing movement of the free end of the actuator 1708' is communicated through the fibre 1705 to the facing end of the lever 1712' The unsupported fibre length of this flexure is 0.5 to 1.5 mm, ideally 0.6 mm. The end of the lever facing the collimator then moves of course in opposite directions, magnifying the movement by the mechanical advantage of the lever—approximately 4:1 in this example.

In the event of an external impulse in the X or Y direction, the lever 1712' is considerably more resistant to unwanted movement than the cantilevered arrangement previously described. Indeed, using the preferred dimensions outlined, to first order the inertial force tending to movie the actuator end down is balanced by the force tending to move the collimator end of the lever (1712') down (when the actuation gain of ~4:1 is taken into account). This balance can be trimmed by adjusting mass added between the gimbal 1750 and the collimator end of actuator 1712'.

The lever 1712' (and indeed the lever 1712) may be formed of stainless steel tube (for example 1.25 mm tube with wall thickness of 0.2 mm) or constructed using a wide variety of techniques, including micro-machining.

Whilst it is convenient to use the fibre to communicate movement between the actuator and the lever, an alternative flexural or other connection is possible.

The foregoing embodiments generally use a form of gimbal in which the desired X Y rocking movement of the collimator is achieved through bending or flexing movement of elements preferably formed in an integral plate structure. This form of gimbal is felt to have a number of advantages, particularly in long term reliability. Alternative arrangements for mounting the collimator are however possible.

An example of an alternative collimator mounting is shown in FIG. 18. Here, a mount indicated generally at 1200 comprises a casing 1210 incorporating three sapphire ball bearings 1220 retained within corresponding holes formed into the casing 1210. The bearings preferably each have a diameter in a range of 150 µm to 500 µm, more preferably substantially 200 µm. The bearings are equispaced around the collimator 340 as illustrated and are held in weak compression against an outside substantially cylindrical surface of the collimator 1230. The casing 1210 is slightly compliant, namely elastically deformable, to provide such compression. When an actuating force is applied by way of the fibre 1240, the collimator 1230 is able to tilt within the mount 1200. Moreover, the collimator 340 is slidably retained between the ball bearings 1220. In operation, the collimator 1230 will slide slightly in the z-axis with respect to the bearing for larger tilting angles, such sliding being readily accommodated by the mount 1220 and not causing its characteristics to change substantially.

If required, the casing 1210 can be extended to support capacitive sensor plates for sensing angular tilt of the collimator 340; either four-plate or eight-plate capacitive sensing arrangements as illustrated in FIG. 9 can be employed.

Whilst the use of an actuator lever which is coaxial with the optic fibre is felt to have a number of important advantages, related to the preservation of axial symmetry as discussed previously, alternative arrangements are possible.

One such alternative will now be described with reference to FIG. 19.

Figure 19:
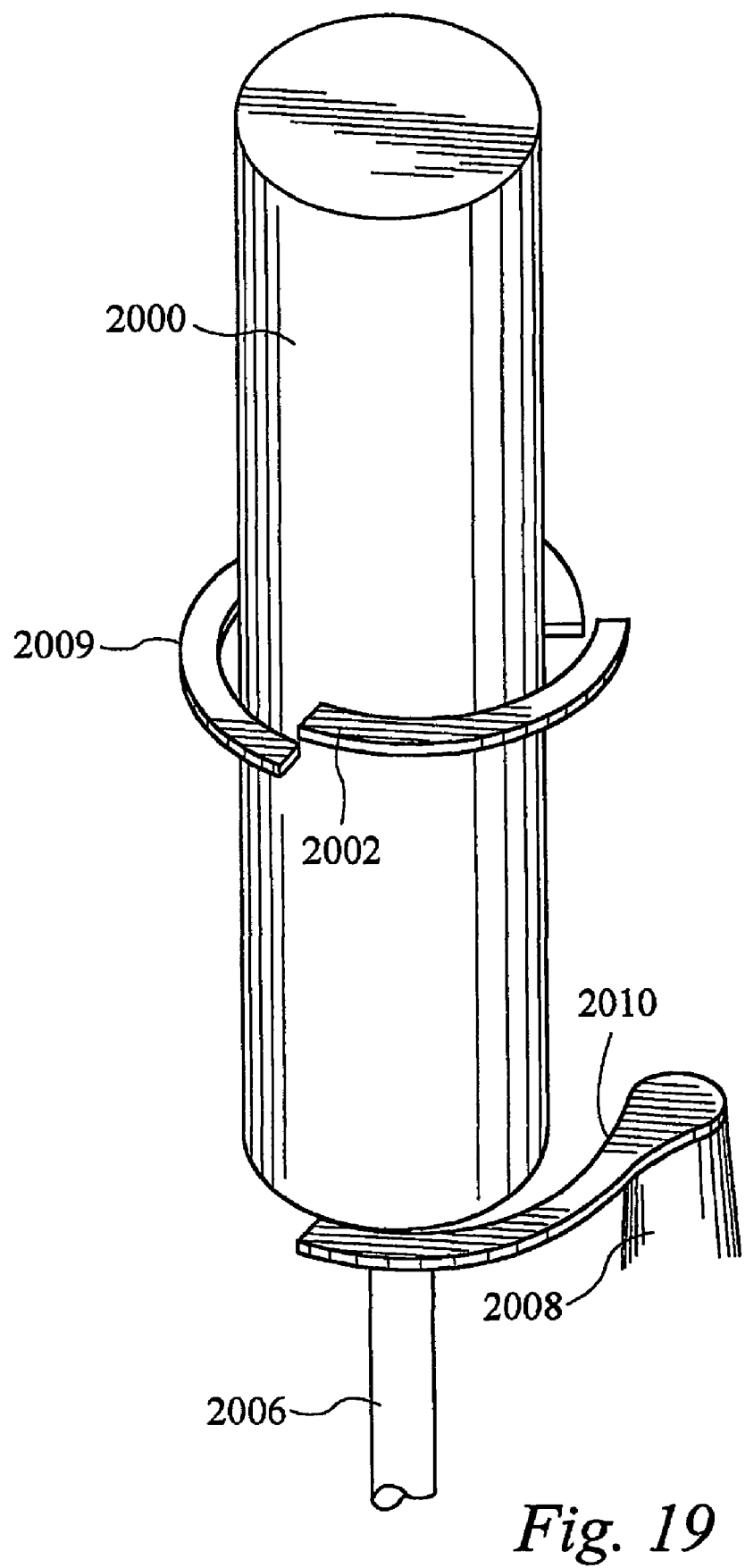
FIG. 19 shows an alternative embodiment of an actuator lever.

FIG. 19 shows an enlarged detail of a collimator 2000 mounted in a gimbal which is represented schematically through flexural elements 2002 and 2004. The collimator 2000 is as before directly connected to the optic fibre 2006.

In this arrangement, the actuator lever in the form of a tapered element 2008 is directly connected with the collimator 2000 through a flexural connecting strip 2010. The actuator lever may be rigidly connected with the actuator or pivoted in the support structure as described with reference to previous embodiments.

In the arrangement of FIG. 19, rocking of the collimator then occurs as a direct result of the movement of the actuator rather than through the intermediary of the optic fibre.

The use of a gimbal or other means to effect rocking of the collimator in X and Y directions without translation in those X and Y directions and with minimal or no translation in the Z direction, has been described in detail and the advantages set forth. In some applications, one dimensional beam deflection will suffice and the gimbal need then rock only about the X axis. In some less demanding applications, it will be appropriate to have a collimator mounting which has no gimbal but which still shares a number of other advantages of the various aspects of this invention.

Figure 20:
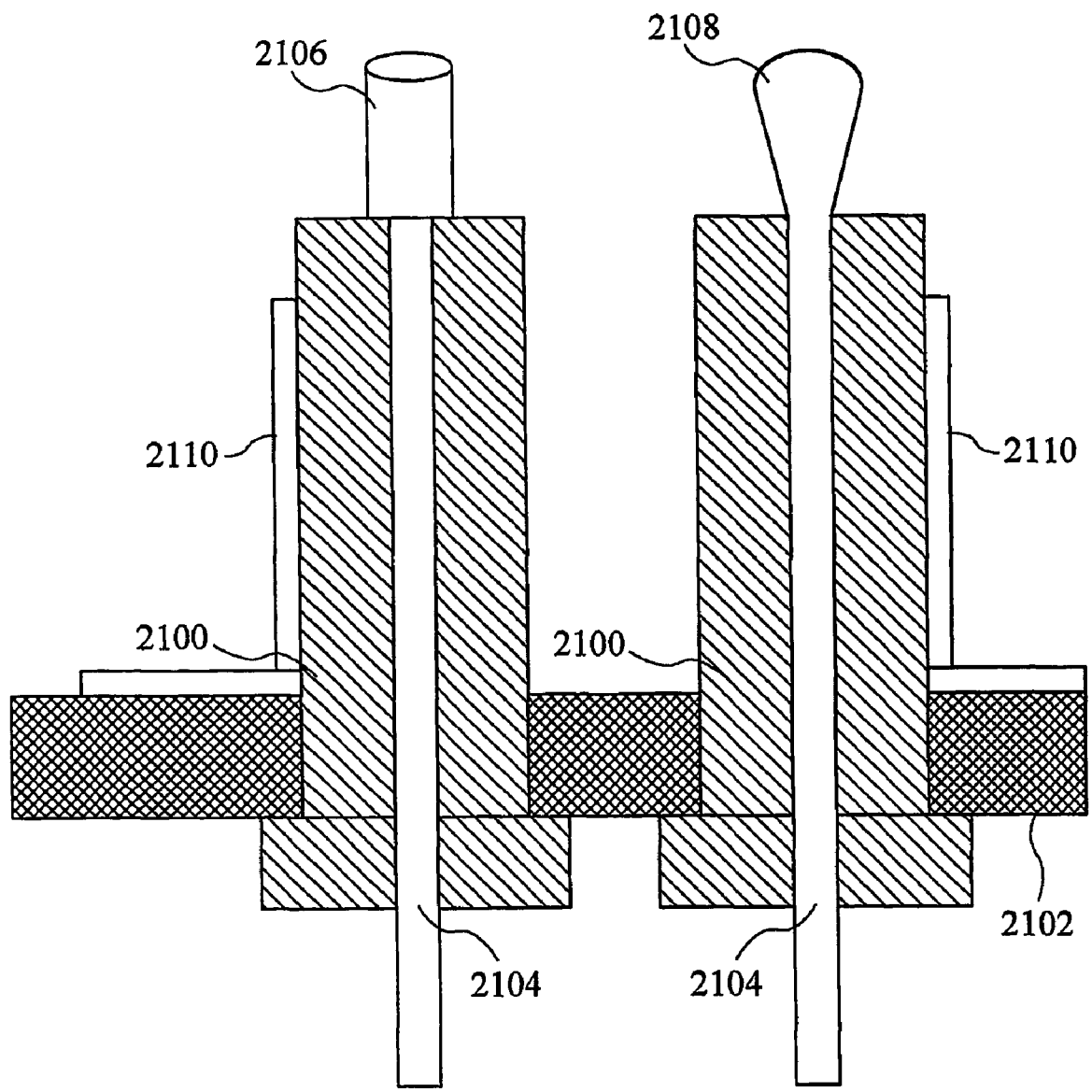
FIG. 20 is a diagrammatic view of a still further embodiment of the present invention.

Such an arrangement is illustrated in FIG. 20.

FIG. 20 shows a support plate 2100 having apertures each receiving a cylindrical piezoelectric actuator 2102. The actuators are hollow and coaxial with central optic fibres 2104. Each optic fibre terminates in a collimator and FIG. 20 conveniently illustrates alternative forms of collimator, both of which can be used with any of the embodiments of this invention. One collimator 2106 takes the form described previously of a collimating lens formed separately from the fibre and bonded to the fibre in a manner which minimises transmission loss. The other collimator 2108 takes the form of a lens created integrally with the fibre through appropriate shaping or treatment of the fibre tip.

The actuators 2100 may take the form previously described with the application of actuating signals causing flexure of the actuator and movement in the X Y directions of the unsupported end of the actuator and thereby of the collimator 2106 or 2108. Terminals for connection with the piezoelectric electrodes are shown at 2110.

Capacitive or other position sensing arrangements as described above can be used within the construction of FIG. 20. For example, a sensing bar such as that shown in FIG. 16, can be positioned around the collimators 2106 or 2108.

The present invention has been described by of examples and a wide variety of further modifications are possible without departing from the scope of the appended claims. A number of different features have been described and certain combinations of those features of been given as examples. Other combinations of these features will also be useful and all combinations are expressly herein disclosed.

Useful information concerning the manufacture and use of certain embodiments disclosed herein will be found in WO 01/50176, to which reference is directed. The disclosure of WO 01/50176 is herein incorporated by reference.

Whilst various forms of angular position sensor have been described as examples, many alternatives of course exist. Thus whilst the use of a collimator electrode and sensing plates has been described, there are other arrangements of interacting parts fixed relatively to the collimator and to the support structure, respectively. Thus the collimator electrode structure can be delineated circumferentially or provided on an element which is fixed relative to the collimator.

The respective parts of the position sensor may interact magnetically rather than electrically; thus one of the interacting parts may generate a magnetic field which is sensed by the other of the interacting parts. Preferably at least one coil carried on the each collimator senses a magnetic field established by two or three coil pairs common to the entire switching array.

Another modification concerns the dynamic bouncing that has been described above in relation to the actuation lever in order to improve the resistance to vibration or mechanical shock. In some applications, there will be no requirement for an actuation lever and the actuator will be connected directly to the collimator, possibly through the intermediary of the optical fibre itself. In such an arrangement, a similar dynamic bouncing effect can be achieved by moving the collimator forwardly with respect to the gimbal so that a greater length of the collimator lies to the outside of the collimator plane. In this way, the moment of inertia of that portion of a collimator lying "outside" the collimator balances that of the portion of the collimator "inside" the collimator together with the effective interconnection with the actuator.

The invention claimed is:

1. A beam steering arrangement comprising a support structure, a moveable collimator, and an optical fiber extending generally along the Z-axis having two opposite ends, one end of which is joined to said collimator and the opposite end of which is located remotely from said one end; means constraining said collimator relative to said support structure for rocking movement only about at least one axis orthogonal to the Z-axis; and actuating means which is adapted to flex when actuated to drive said rocking movement of said collimator, wherein said actuating means incorporates an arm which extends substantially along the Z-axis and displaces in at least one axis orthogonal to the Z-axis.

2. A beam steering arrangement according to claim 1, wherein said arm is positioned substantially behind said moveable collimator.

3. A beam steering arrangement according to claim 1, wherein said arm incorporates a laminate of interleaved layers of electrode plates and piezoelectric material, having an upper, in use, region of electrode plates which when energized effect deflections in up and down directions, a lower region of electrode plates which when energized effect deflections in up and down directions, and at least one further region of electrode plates which when energized effect deflections in left and right directions.

4. A beam steering arrangement according to claim 1, including a position sensor providing a signal indicative of the orientation of said collimator for use in feedback by said actuating means in steering of the beam.

5. A beam steering arrangement according to claim 1, wherein said collimator is mounted on said support structure through a mount, said mount having means for contributing to the rocking movement of the collimator.

6. A beam steering arrangement according to claim 1, wherein said collimator is mounted on said support structure through a gimbal.

7. A beam steering arrangement according to claim 1, wherein said mount comprises position sensor means.

8. A beam steering arrangement according to claim 1, wherein said actuating means has a first portion adapted to flex when actuated and a second portion adapted to amplify the amount of movement from the Z-axis achieved by the first portion.

9. A beam steering arrangement according to claim 8, wherein said second portion is essentially frusto-conical.

10. A beam steering arrangement according to claim 1, wherein said actuating means operates upon the optical fiber and the action of the optical fiber upon the collimator serves to move the collimator.

11. A beam steering arrangement according to claim 1, wherein said collimator has a first and a second end and wherein said one end of said fiber is joined to said collimator at said first end thereof while the optical beam exits the collimator at the second end thereof and the actuating means extends generally along the Z-axis and is operatively connected to said collimator while being sufficiently separated from said constraining means so that when the actuating means displaces in one direction, the second end of said collimator displaces in the opposite direction; thereby resulting in said rocking movement about said constraining means.

* * * * *